Figure 1:
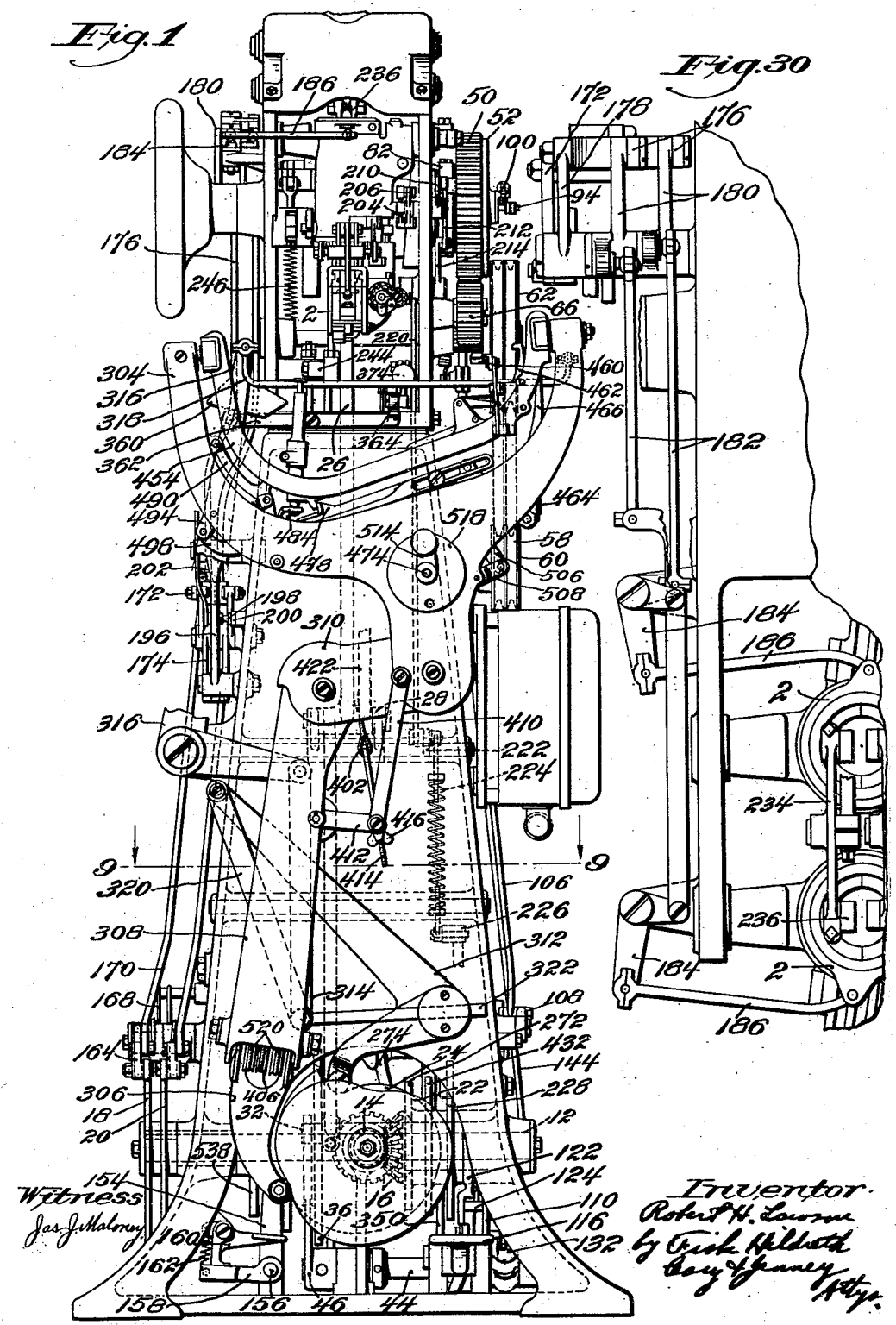

May 21, 1940.   R. H. LAWSON   2,201,866
MACHINE FOR USE IN THE MANUFACTURE OF SHOES
Filed Sept. 26, 1938   21 Sheets-Sheet 1

May 21, 1940. R. H. LAWSON 2,201,866
MACHINE FOR USE IN THE MANUFACTURE OF SHOES
Filed Sept. 26, 1938 21 Sheets-Sheet 6

Witness
Jas J Maloney

Inventor
Robert H Lawson
by Fish Hildreth
Cary & Jenney Attys

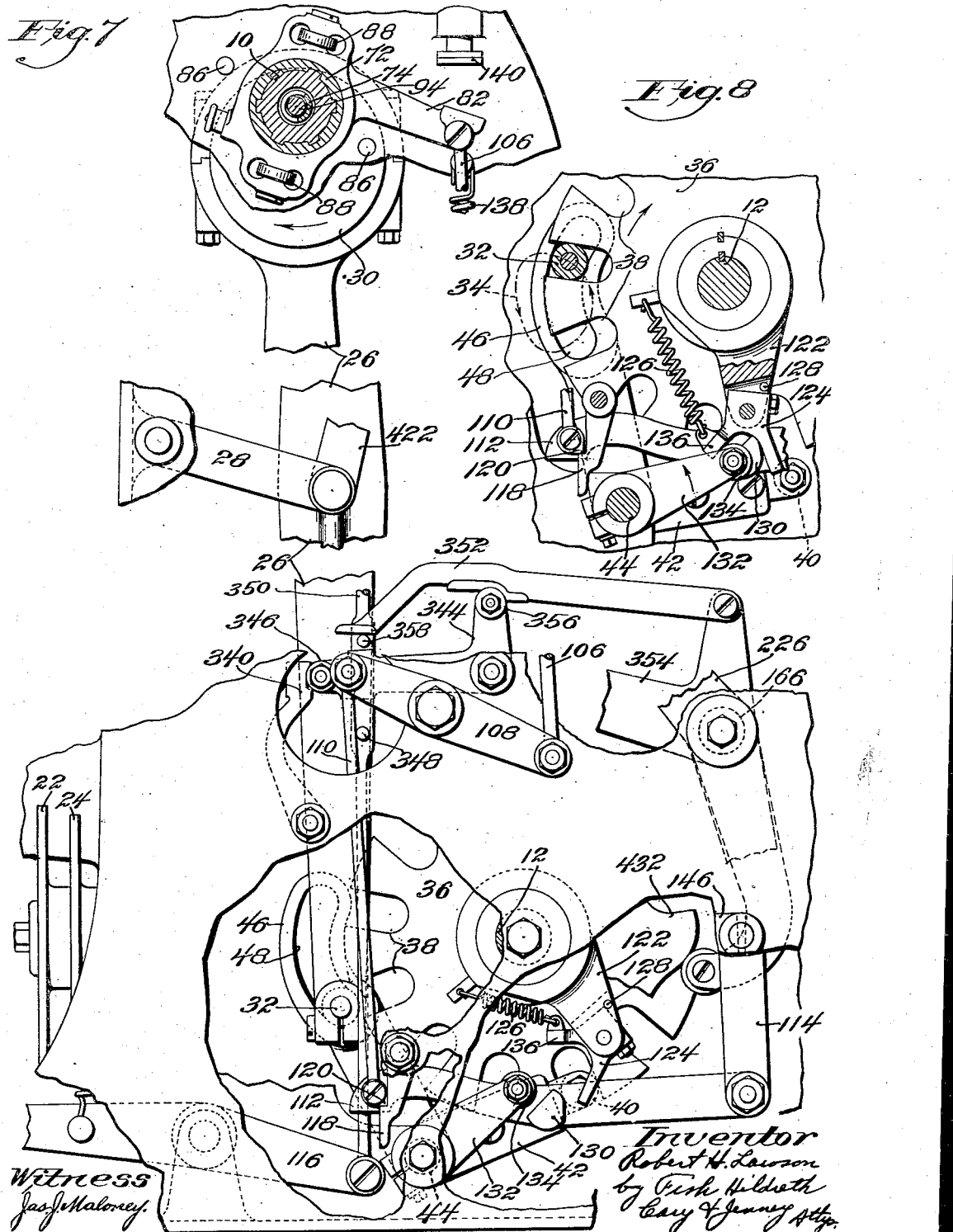

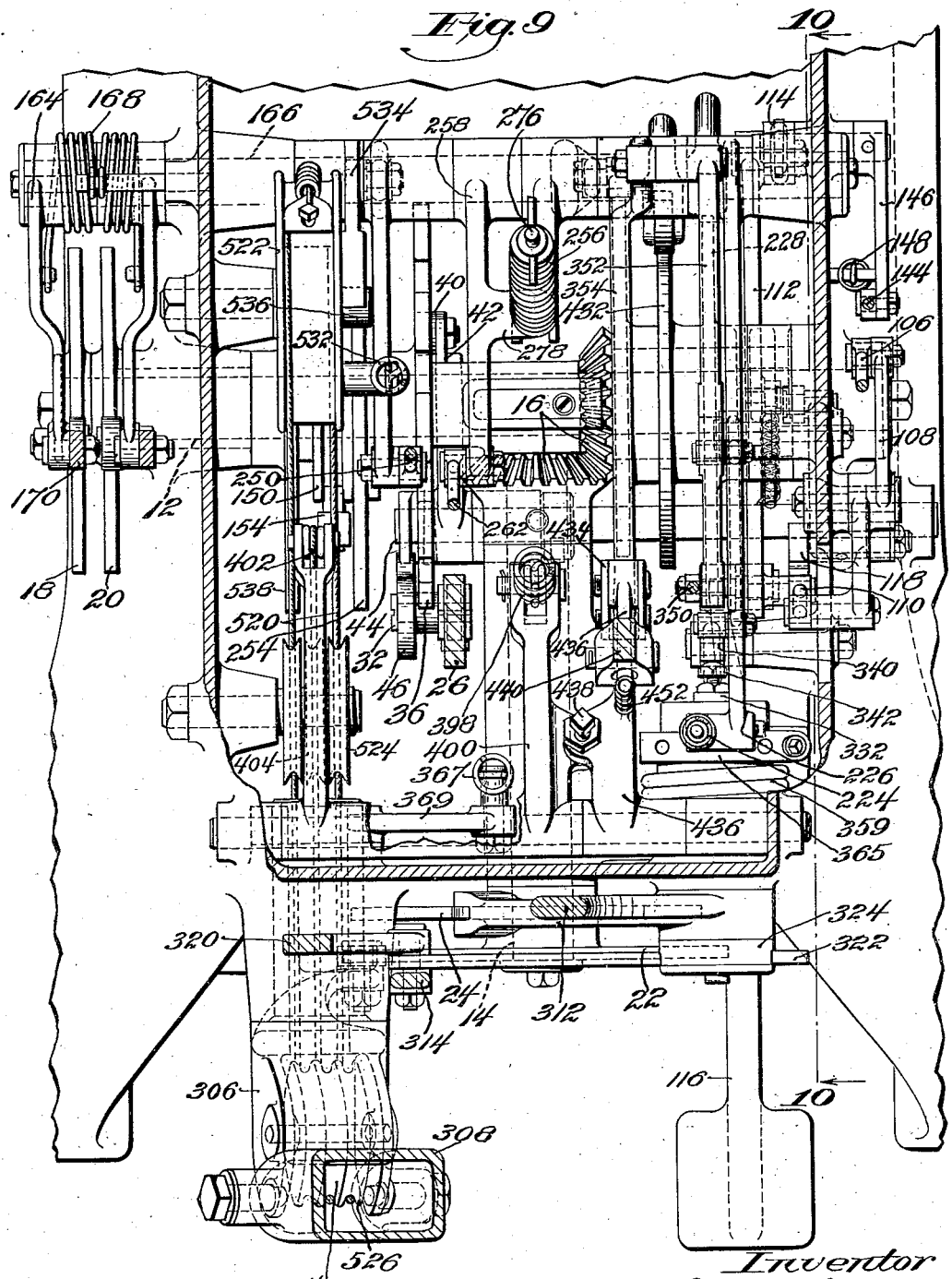

May 21, 1940. R. H. LAWSON 2,201,866
MACHINE FOR USE IN THE MANUFACTURE OF SHOES
Filed Sept. 26, 1938 21 Sheets-Sheet 9

Witness
Jas.J.Maloney.

Inventor
Robert H. Lawson
by Fish Hildreth
Cary & Jenney Attys.

May 21, 1940.  R. H. LAWSON  2,201,866
MACHINE FOR USE IN THE MANUFACTURE OF SHOES
Filed Sept. 26, 1938  21 Sheets-Sheet 11

Witness
Jas. J. Maloney

Inventor
Robert H. Lawson
by Fish Hildreth
Cary & Jenney Attys.

May 21, 1940. R. H. LAWSON 2,201,866
MACHINE FOR USE IN THE MANUFACTURE OF SHOES
Filed Sept. 26, 1938 21 Sheets-Sheet 12

Witness
Jas. F. Maloney

Inventor
Robert H. Lawson
by Fish Hildreth
Cary & Jenney Attys.

May 21, 1940.  R. H. LAWSON  2,201,866
MACHINE FOR USE IN THE MANUFACTURE OF SHOES
Filed Sept. 26, 1938  21 Sheets-Sheet 13
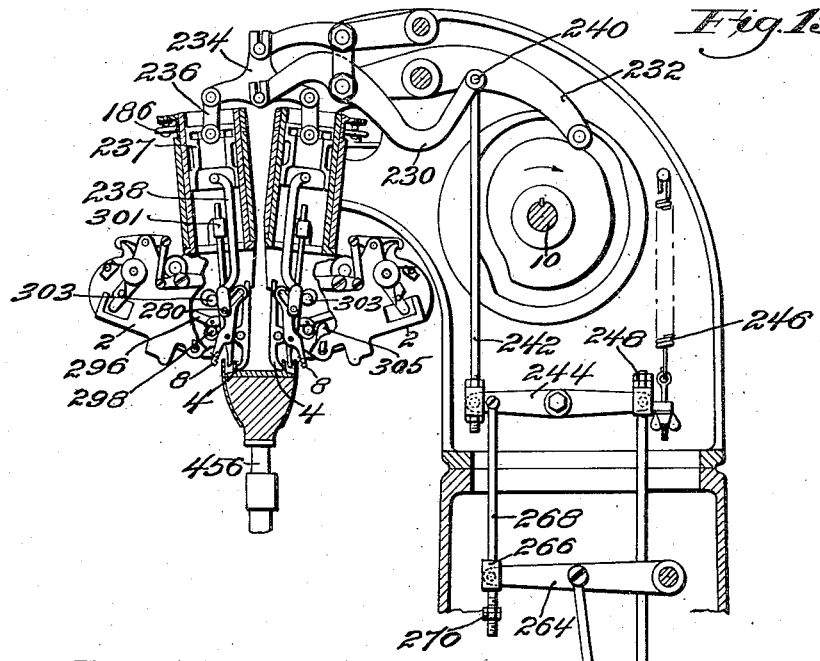
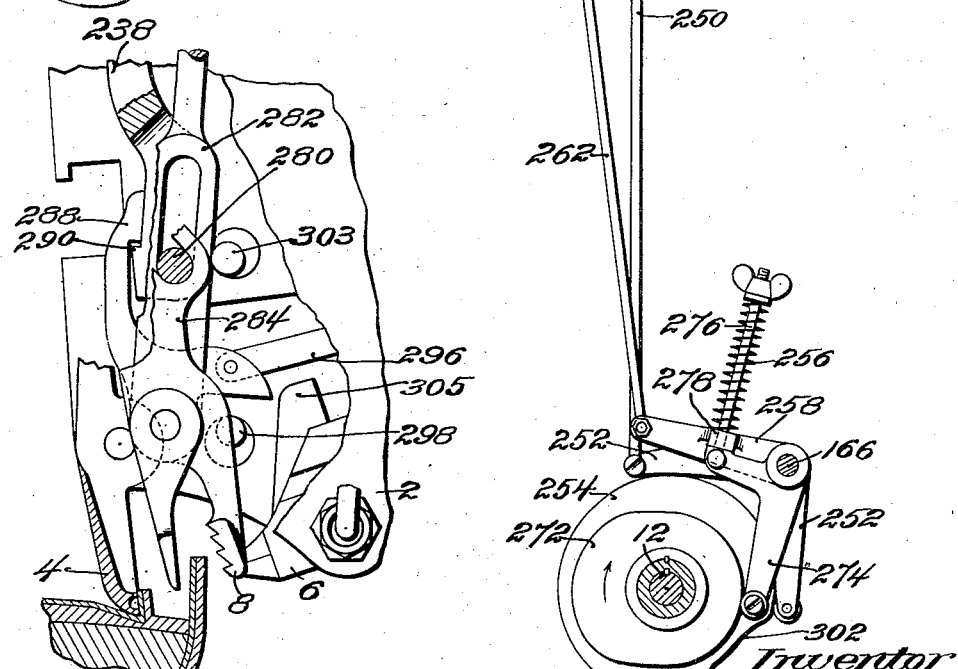

May 21, 1940.  R. H. LAWSON  2,201,866
MACHINE FOR USE IN THE MANUFACTURE OF SHOES
Filed Sept. 26, 1938  21 Sheets-Sheet 14
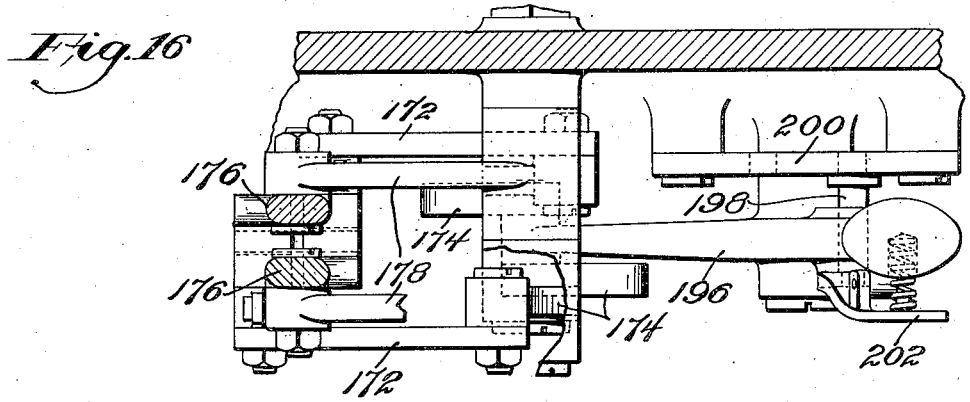
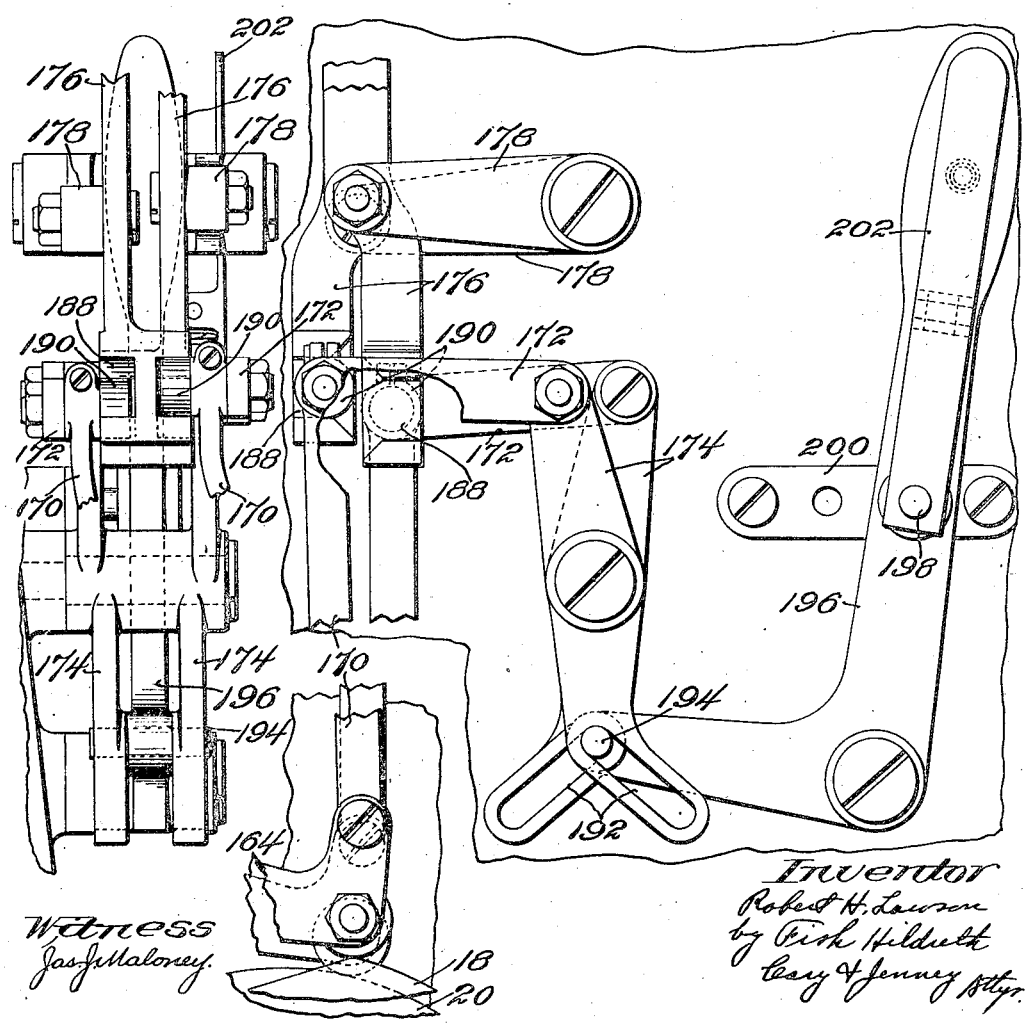

May 21, 1940.  R. H. LAWSON.  2,201,866
MACHINE FOR USE IN THE MANUFACTURE OF SHOES
Filed Sept. 26, 1938   21 Sheets-Sheet 16
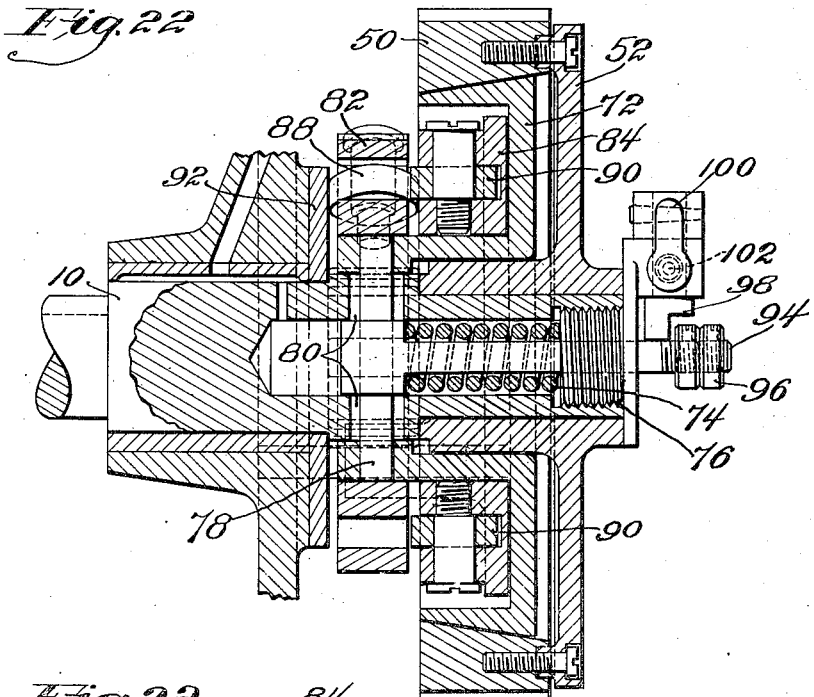
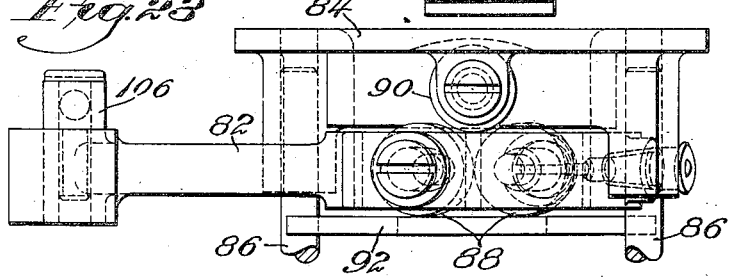
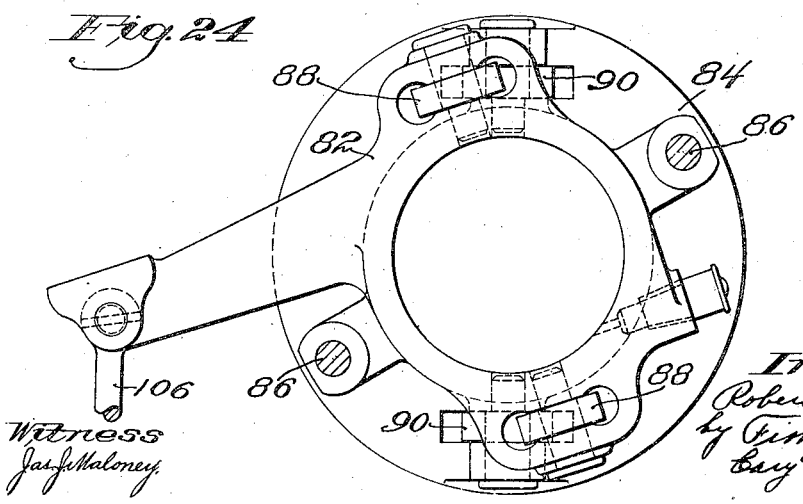

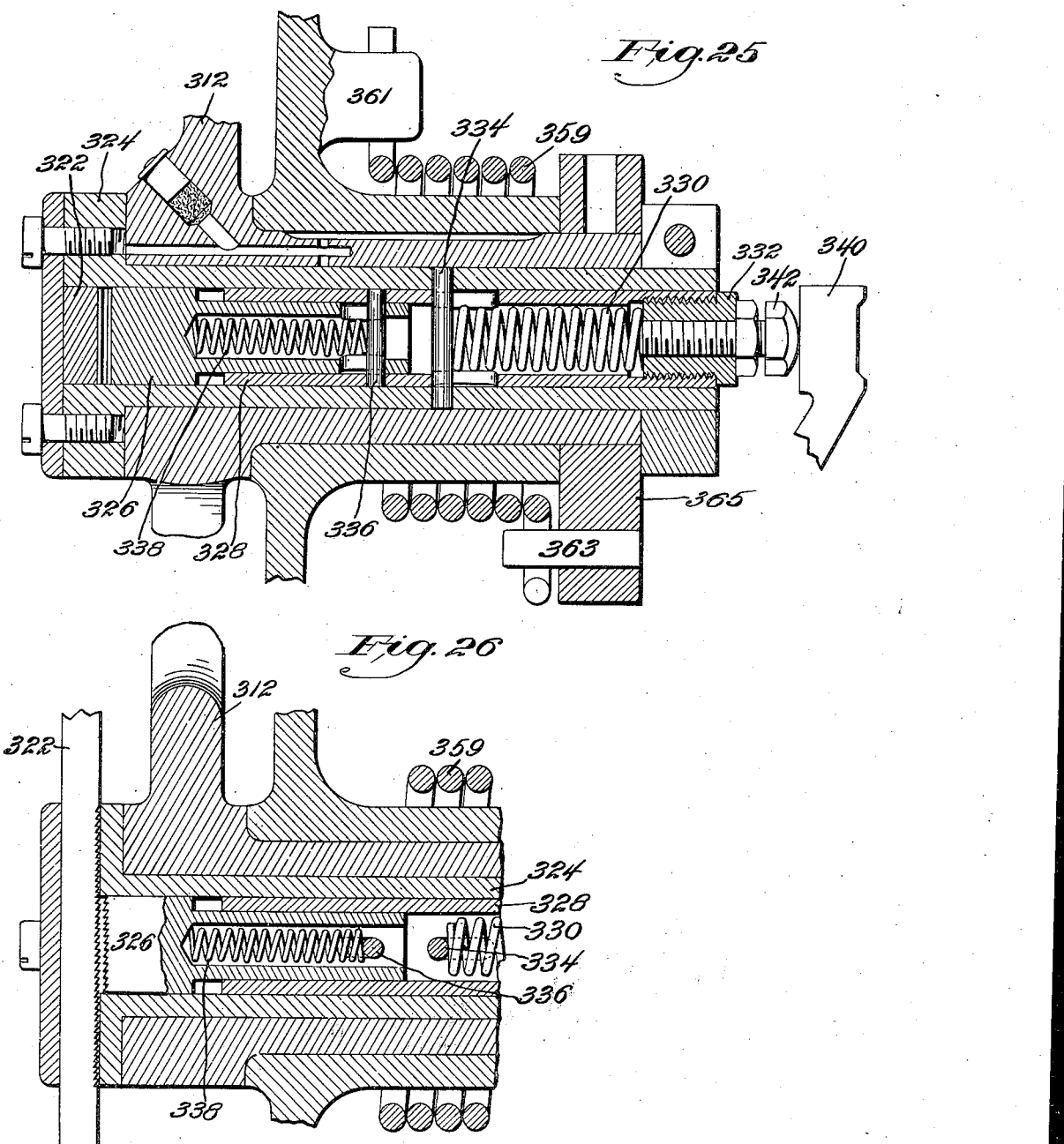

May 21, 1940.   R. H. LAWSON   2,201,866
MACHINE FOR USE IN THE MANUFACTURE OF SHOES
Filed Sept. 26, 1938   21 Sheets-Sheet 18

Witness
Jas. J. Maloney

Inventor
Robert H. Lawson
by Fish Hildreth
Cary & Jenney Attys

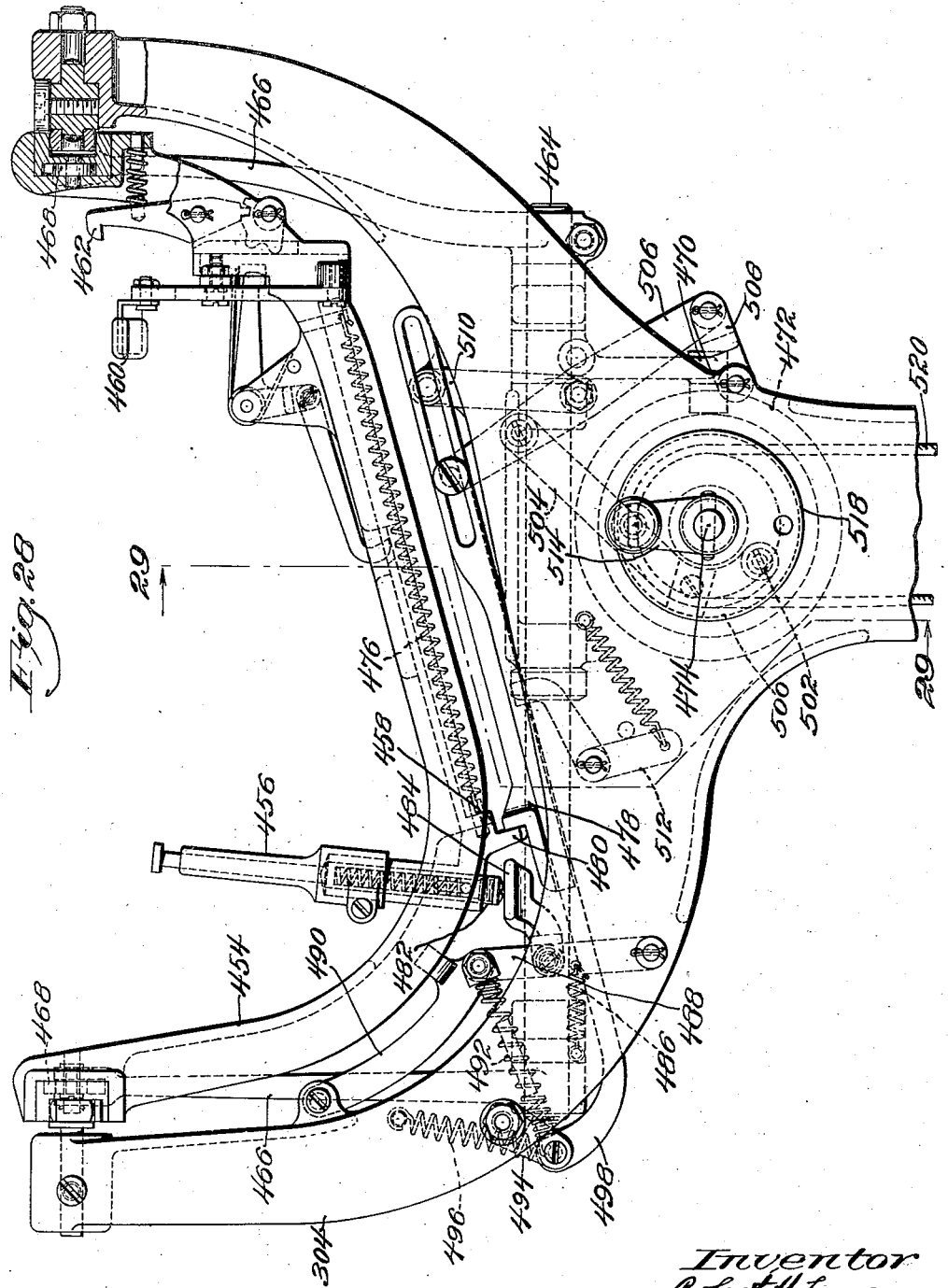

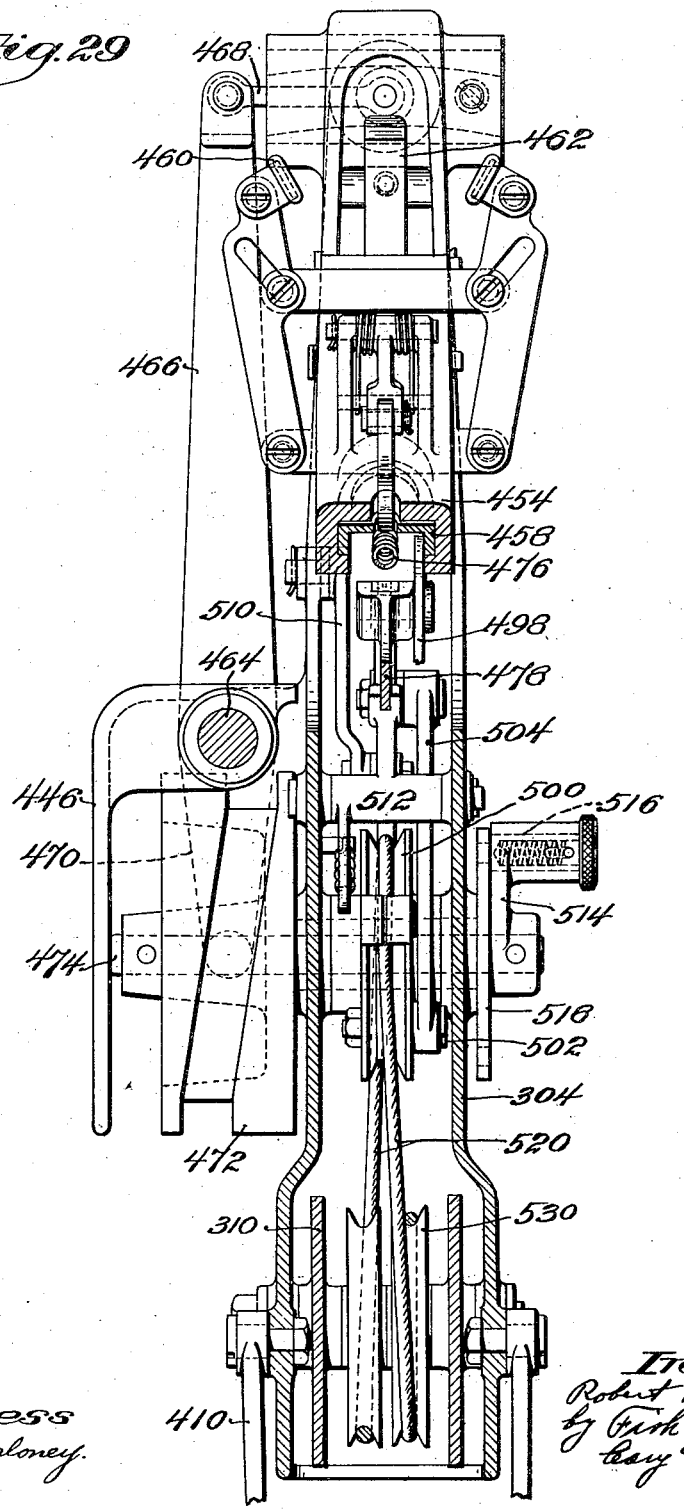

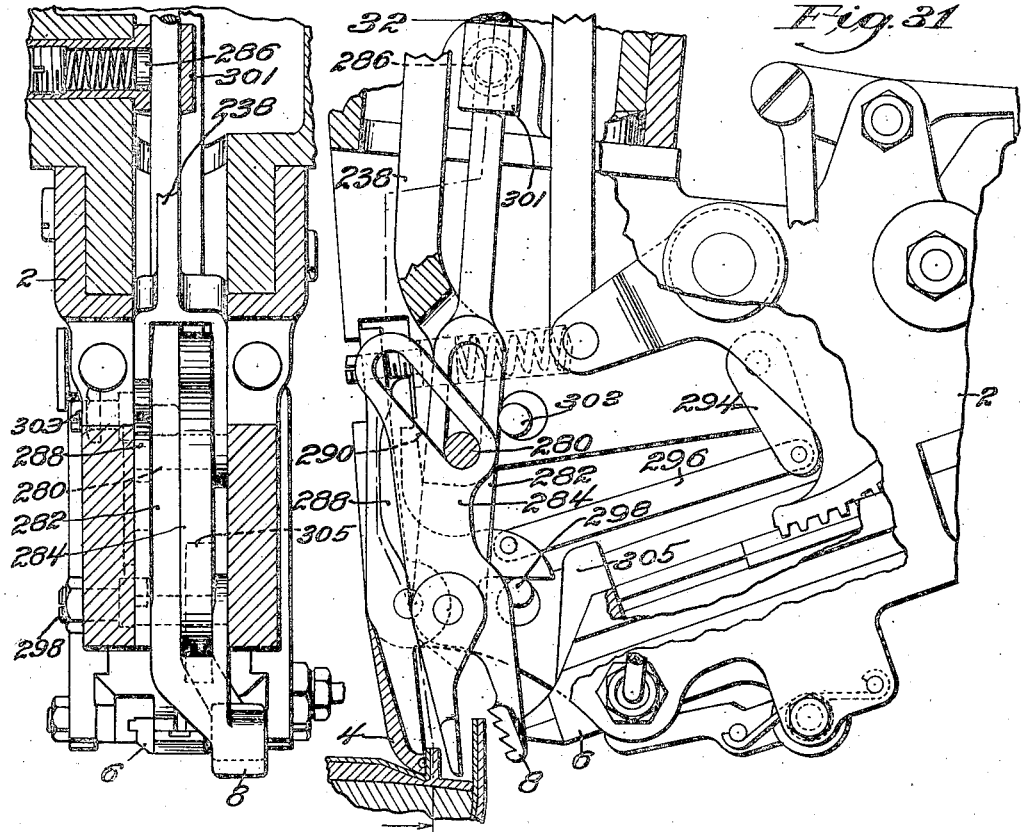

Patented May 21, 1940

2,201,866

UNITED STATES PATENT OFFICE 2,201,866

MACHINE FOR USE IN THE MANUFACTURE OF SHOES

Robert H. Lawson, Beverly, Mass., assignor to United Shoe Machinery Corporation, Borough of Flemington, N. J., a corporation of New Jersey Application September 26, 1938, Serial No. 231,750

65 Claims. (Cl. 12—4)

The present invention relates to machines for use in the manufacture of shoes, and is herein illustrated as embodied in a side lasting machine of the type disclosed in applicant's prior Patents No. 1,706,619 dated March 26, 1929, No. 1,854,204 dated April 19, 1932, No. 1,963,170 dated June 19, 1934, and No. 1,999,298 dated April 30, 1935.

It is to be understood, however, that while the several features of the present invention are particularly applicable to an automatic side lasting machine, such as disclosed in the patents referred to, comprising lasting devices arranged to operate progressively along opposite sides of a shoe supported upon a jack, certain features of the invention are well adapted for use in automatic machines other than lasting machines, or in lasting machines which are not automatic.

Machines of the type disclosed in the patents referred to comprise, in addition to the operating cam shaft from which the lasting devices are actuated, a plurality of pattern cams which act, during the lasting operation, to control the position and action of certain of the operating instrumentalities, and to impart feeding and positioning movements to the jack. During the lasting operation, the pattern cams must obviously be driven in timed relation to the operating cam shaft. In this type of machine, however, after the completion of the lasting operation on the shoe, certain additional operations are performed, such for instance, as depressing the jack, moving the jack outwardly and imparting a return or back feeding movement to the jack to bring it into position for the removal of the completed shoe, and the substitution of a new shoe, unclamping the shoe, resetting the automatic shoe clamping mechanism, moving the lasting units towards each other and rendering operative the mechanism by which the initial position of the lasting units is subsequently adjusted.

In this type of machine, as heretofore constructed, in order to enable the pattern cams to continue to function after the finish of the lasting operation, it has been necessary to provide means for disconnecting the operating cam shaft from its driving means, and to complete the rotation of the pattern cams independently of the operating cam shaft. Also to enable all of the desired operations to be performed before the machine is finally stopped, it has been necessary to provide an auxiliary mechanism, together with means for throwing it into operation, as the operating cam shaft is thrown out.

An object of the present invention is to provide a simplified and improved machine by which all of the desired operations can be performed before the machine is finally stopped without the use of such an auxiliary mechanism and without a rotation of the pattern cams independently of the operating cam shaft.

Another object of the invention is to improve the construction of certain of the pattern cams, and the manner in which they are operated, and more particularly to improve the construction and operating mechanism of the pattern cam from which feeding movements are imparted to the jack.

Another object of the present invention is to improve the arrangement of the pattern cams and their driving mechanism so as to render the pattern cams more readily accessible for removal and replacement and thereby avoid the use in a machine at one time of banks of adjustable cams for shoes of different styles.

Another object of the invention is to provide a simplified and improved jack supporting structure by which the jack may be rigidly supported while the successive portions of the shoe upper are tensioned and secured, but which permits the jack to be moved into and out of operating position at the beginning and end of the operation on the shoe and also permits the jack to be easily actuated to transfer the point of operation along the shoe and to cause the shoe to be presented in the most advantageous manner to the upper tensioning and securing devices.

Another object of the invention is to simplify and improve the mechanism by which certain of the instrumentalities of the machine are actuated and controlled during the lasting operation, and also the mechanisms by which certain operations are performed or facilitated both before the machine is put into operation and after the operation on the shoe has been completed.

With the above objects in view, a feature of the invention contemplates the provision, in an automatic shoe machine comprising a cam shaft by which the devices which act on the shoe are operated, a shoe supporting jack and pattern cams by which the relative positions of said devices and jack are controlled during the operation on a shoe and by which certain additional operations are performed as the machine is stopped, of a construction and arrangement of parts whereby the desired additional operations may be performed during the continued rotation of the operating cam shaft after the operation on the shoe has been completed, and the operating cam shaft and pattern cams may be disconnected from a common driving mechanism before the devices which act on the shoe are again operated. This feature of the invention is preferably embodied in a construction in which the pattern cams are rotated intermittently, which mode of operation permits the use of simplified and more efficient forms of pattern cams and particularly a pattern cam for imparting intermittent feeding movements to the jack which is of gradually changing contour and consequently much more easily and cheaply produced than the continuously rotated stepped cam of prior machines.

In embodying this feature of the invention in the machine hereinafter specifically described, a single main clutch has been provided for driving the operating cam shaft and the pattern cams, and in order to open the clutch so as to finally stop the machine at the desired point in the rotation of the operating cam shaft, after the additional operations have been performed by the pattern cams, a new and improved means for actuating the clutch has been devised comprising mechanism moving with the pattern cams into operative position, but actuated by the operating cam shaft to open the clutch.

The specific embodiment of this feature of the invention hereinafter described also comprises a novel and efficient mechanism for imparting the intermittent movements to the pattern cams from the continuously driven operating cam shaft.

The feature of the present invention relating to an improved arrangement of the pattern cams and their driving mechanism contemplates the provision of a pattern cam shaft with means for securing a pattern cam on the shaft outside of the shaft bearing so as to permit the cam to be readily removed and replaced axially of the shaft. Preferably a plurality of pattern cam shafts having provision for the removal and replacement of pattern cams in this manner are provided. The machine is thus adapted for operation on any style of shoe by a simple and quick change of one or more pattern cams and the necessity of supporting and driving a large number of inoperative cams as in the prior machine is avoided.

The improved jack supporting structure of the present invention comprises a pivotally mounted base and a horizontally extending jack supporting link pivotally connected at one end to the base, and at the other end to the jack frame, the arrangement being such that the base, the link and the frame are free to swing about parallel axes which are transverse to and substantially parallel with the bottom of the shoe on the jack. With this construction, the jack can be held firmly against displacement during the operation on the shoe and can be readily actuated in a certain and reliable manner and by comparatively simple connections to transfer the point of operation along the shoe and to present the shoe in the desired manner to the operating devices.

In connection with the jack supporting structure, new and improved means are provided for exerting an upward pressure on the jack to force the shoe towards the operating devices during the operation on the shoe, new and improved means acting during the operation on the shoe to shift the shoe transversely on the jack with relation to its supporting means, and new and improved means, acting on stopping the machine, to unclamp the shoe and reset the automatic shoe clamping mechanism for operation on the next shoe.

Certain features of the present invention relate to simplified and improved means for actuating and controlling the devices which perform the operation on the shoe. In accordance with one of these features, certain devices are controlled as to their position with relation to the jack by means of a pair of pattern cams and connections between the cams and devices arranged to be interchanged so that during the operation on a left shoe each cam will actuate the connections actuated by the other cam during the operation on a right shoe. A simple and efficient means is thus provided to adapt the machine for both right and left shoes without the addition of separate cams or mechanisms. In the illustrated machine hereinafter described, this feature of the invention is embodied in the mechanism for swinging the lasting units about axes substantially perpendicular to the shoe bottom.

Certain features of the present invention relate to new and improved means for controlling the action of the upper tensioning grippers. In the machines of the patents referred to the mechanism for actuating the upper tensioning grippers comprises a series of cam actuated connections including a lever pivotally mounted upon a cam lever and connected at its opposite ends respectively with a gripper and with a spring pressed rod. To move the gripper towards and from the shoe, the pivotally mounted lever is swung about its pivotal connection with the spring pressed rod, which connection constitutes the fulcrum of the lever. During the up movement of the gripper this fulcrum yields upwardly, thus permitting a yielding strain to be exerted on the upper. To cause the gripper to move downwardly towards the shoe the fulcrum is held rigidly against downward movement and in the machine of Patent No. 1,963,170 means are provided for at times permitting a downward movement of the fulcrum and thereby cause the gripper to be retained out of operation during one or more cycles of the upper securing devices. A feature of the present invention contemplates the provision in a gripper mechanism comprising a gripper actuating lever having a fulcrum yieldingly supported against movement in one direction of means including a pattern cam and connections for supporting the fulcrum against movement in the opposite direction. The pattern cam provides a simple and efficient means by which the gripper can be thrown out of operation and also affords a means by which the movement of the gripper towards the shoe may be varied and thereby, in connection with the feature next referred to, prevent the jaws of the gripper from closing on the upper and exerting a pull thereon while it is desired to hold the gripper out of operation.

The gripper actuating mechanism of applicant's prior machines comprises an actuating member which has a movement with relation to the gripping jaws to open and close the jaws, and a movement with the jaws to impart updraw and return movements to the jaws. A feature of the present invention contemplates the provision, in a gripper actuating mechanism of this character, of means for rendering the gripper inoperative, comprising means for preventing relative movement of the member and jaws during the movement of the member away from the shoe. In embodying this feature in the illustrated machine, a latch has been provided to connect the actuating member and jaws, which latch is normally held in inoperative position during the jaw closing movement of the member, but is caused to connect the jaws and actuating member when a movement towards the shoe somewhat shorter than normal is imparted to the member. In the illustrated machine the extent of this movement is regulated by the pattern cam above referred to, which supports the fulcrum of the gripper actuating lever during the movement of the gripper towards the shoe. After the jaws are connected to the actuating member, the jaws move with the member throughout its movement away from the shoe without being closed upon the upper. The jaws remain open so long as they are connected to the actuating member by the latch and cannot engage and tension the upper during subsequent movements of the actuating member.

In the machines of applicant's Patents Nos. 1,854,204 and 1,963,170, the upper tensioning grippers are supported so as to be capable of a transverse swinging movement inwardly over the sole edge towards the center line of the sole as the edge of the tensioned upper is wiped inwardly by the wipers associated with the stapling devices, this movement of the grippers being produced by a pull exerted on the grippers by the upper as it is forced into place by the wipers. To avoid any injury to the upper by reason of this mode of operation, a feature of the present invention is embodied in a construction comprising means acting independently of the upper to move the grippers inwardly simultaneously with the movement of the wipers. Conveniently this means comprises a cam surface on the wiper carrier arranged to contact with one of the gripper jaws and positively move the gripper inwardly simultaneously with the movement of the upper.

To provide novel and improved means for guiding the movements of the gripping jaws towards and from the shoe, a feature of the present invention is embodied in a construction comprising a guide at the side of the gripping jaws remote from the center line of the sole, together with means for yieldingly holding the jaws in contact with the guide during the updraw and return movements of the grippers. This construction insures an updraw movement of the grippers substantially in the plane of the side of the shoe last and prevents any movement outside of this plane in a direction tending to loosen fasteners previously inserted. Preferably this guide is adjustably mounted so as to permit the path of movement of the gripping jaws to be varied as desired. The provision of such an adjustable guide arranged to engage the gripping jaws on either side together with means for yieldingly holding the jaws against the guide is also considered to constitute a feature of the invention.

Another feature of the present invention relates to new and improved means for exerting an upward pressure on the jack to force the shoe towards the operating devices and for relieving this pressure during the feeding movements of the shoe. In accordance with this feature, means are provided for relieving the upward pressure of the jack through connections actuated from the comparatively high speed operating cam shaft instead of from a low speed pattern cam as in the prior machines, whereby this operation is performed in a simple and reliable manner during each cycle of operations of the upper tensioning and securing devices.

A feature of the present invention relating to the operations which are performed before the machine is put into operation contemplates the provision of a new and improved construction and arrangement of the connections between a pattern cam and the jack through which feeding movements are imparted to the jack and which are adjusted for shoes of different sizes by the movement of the jack to its starting position.

Features of the present invention, in addition to those hereinbefore referred to, relating to operations which are performed after the operation on the shoe is completed contemplate new and improved means for depressing the jack to free it from the operating devices, for moving the jack outwardly, for rendering operative the mechanism through which the position of the lasting units transversely of the shoe is subsequently adjusted by the movement of the jack to starting position for operation on the next shoe, and for unlocking the adjustable connections through which feeding movements are imparted to the jack. The mechanisms for performing these operations not only simplify the construction and arrangement of the parts of automatic shoe machines of the type to which the present invention relates but, in connection with the other improvements, facilitate the elimination of an auxiliary mechanism from this type of machines.

Figure 2:
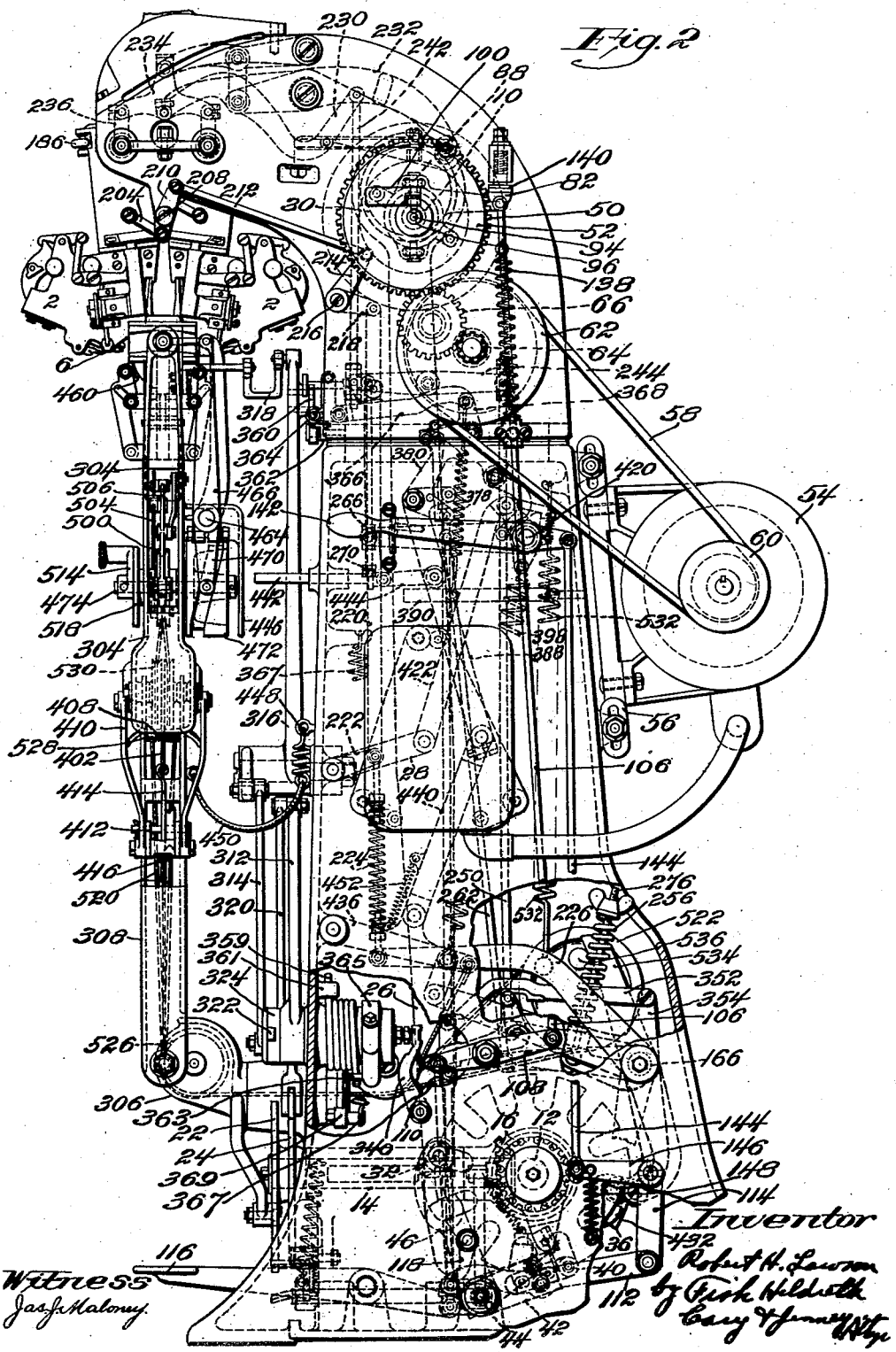
Figure 3:
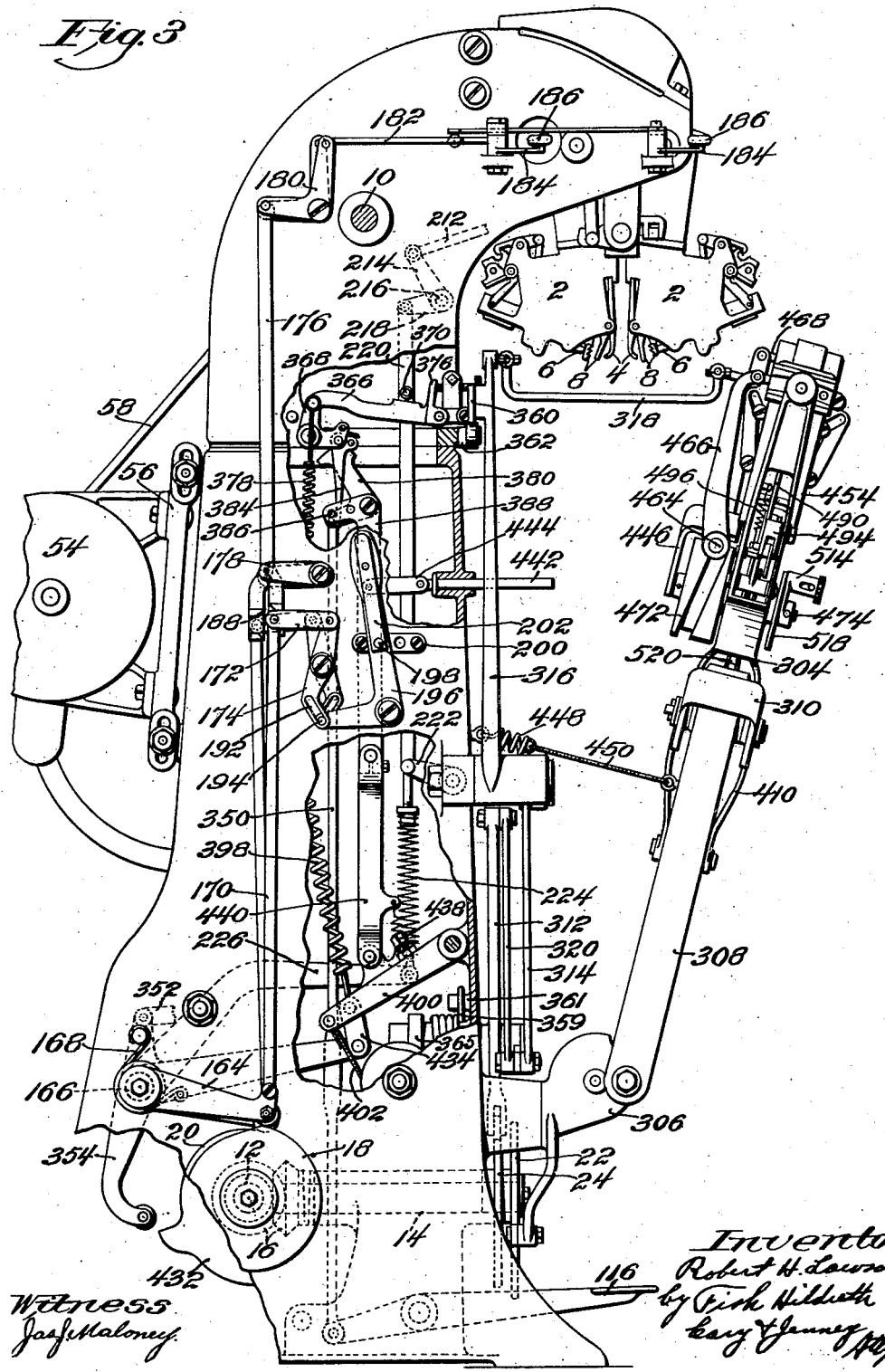
Figure 4:
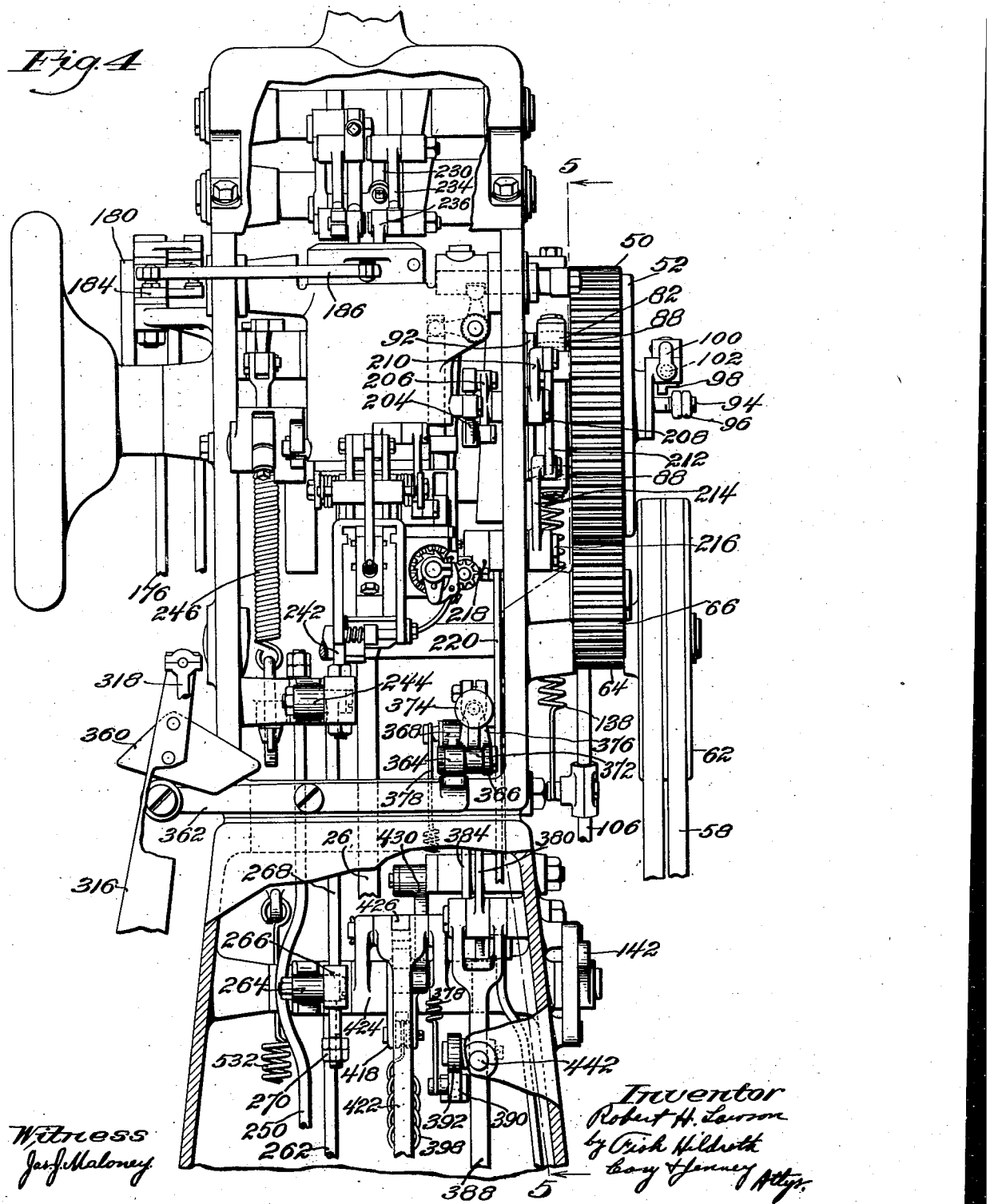
Figure 5:
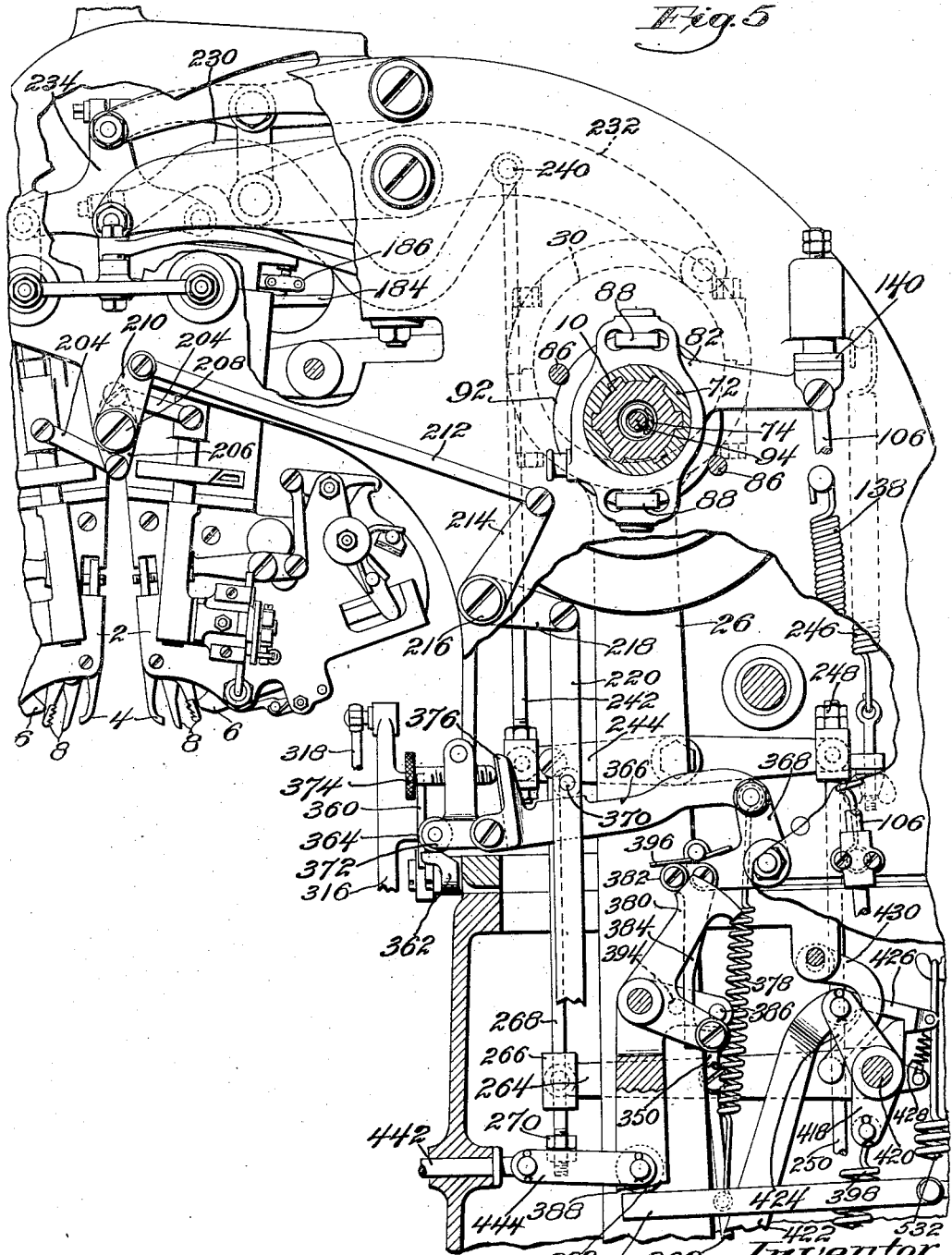
Figure 6:
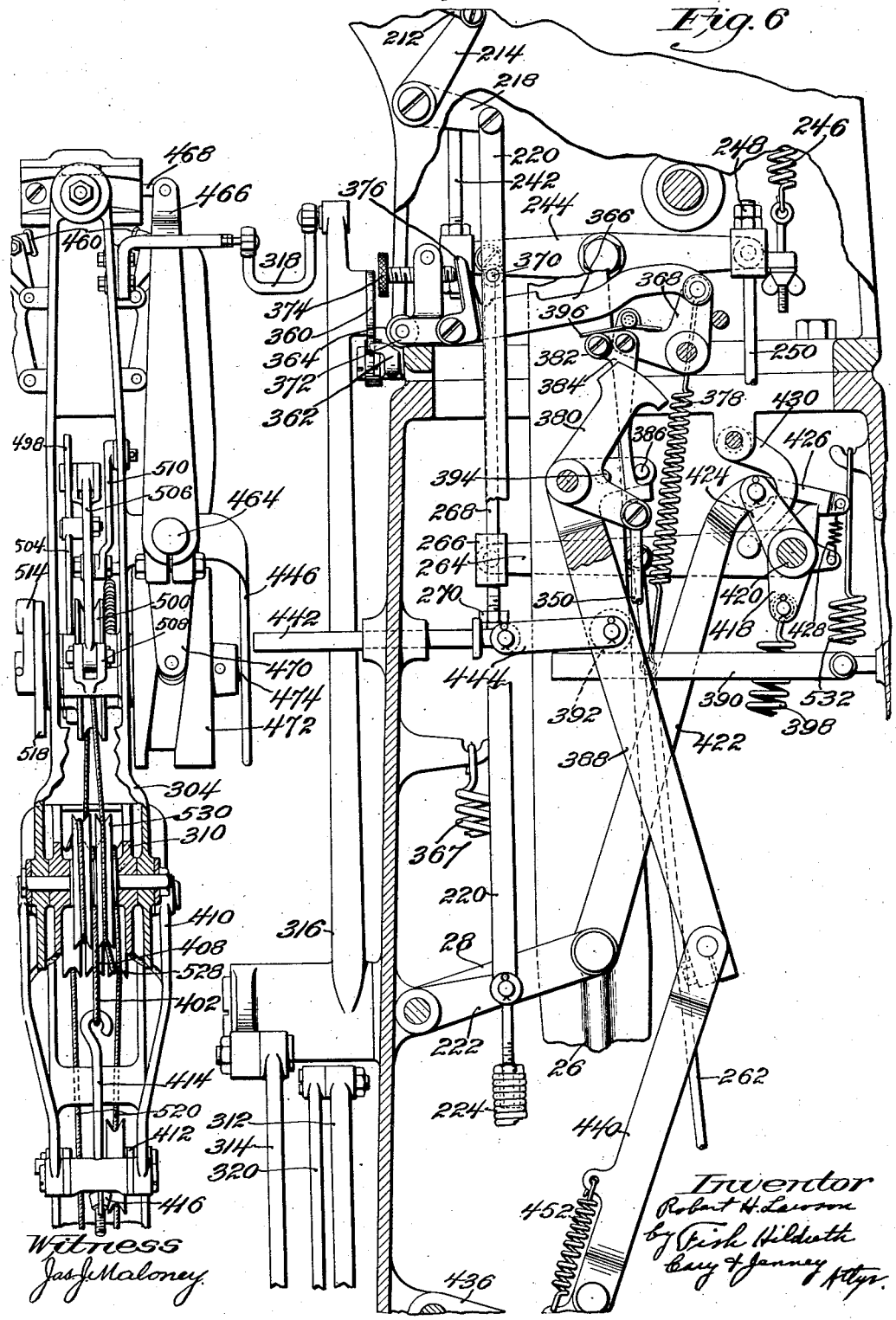
Figure 10:
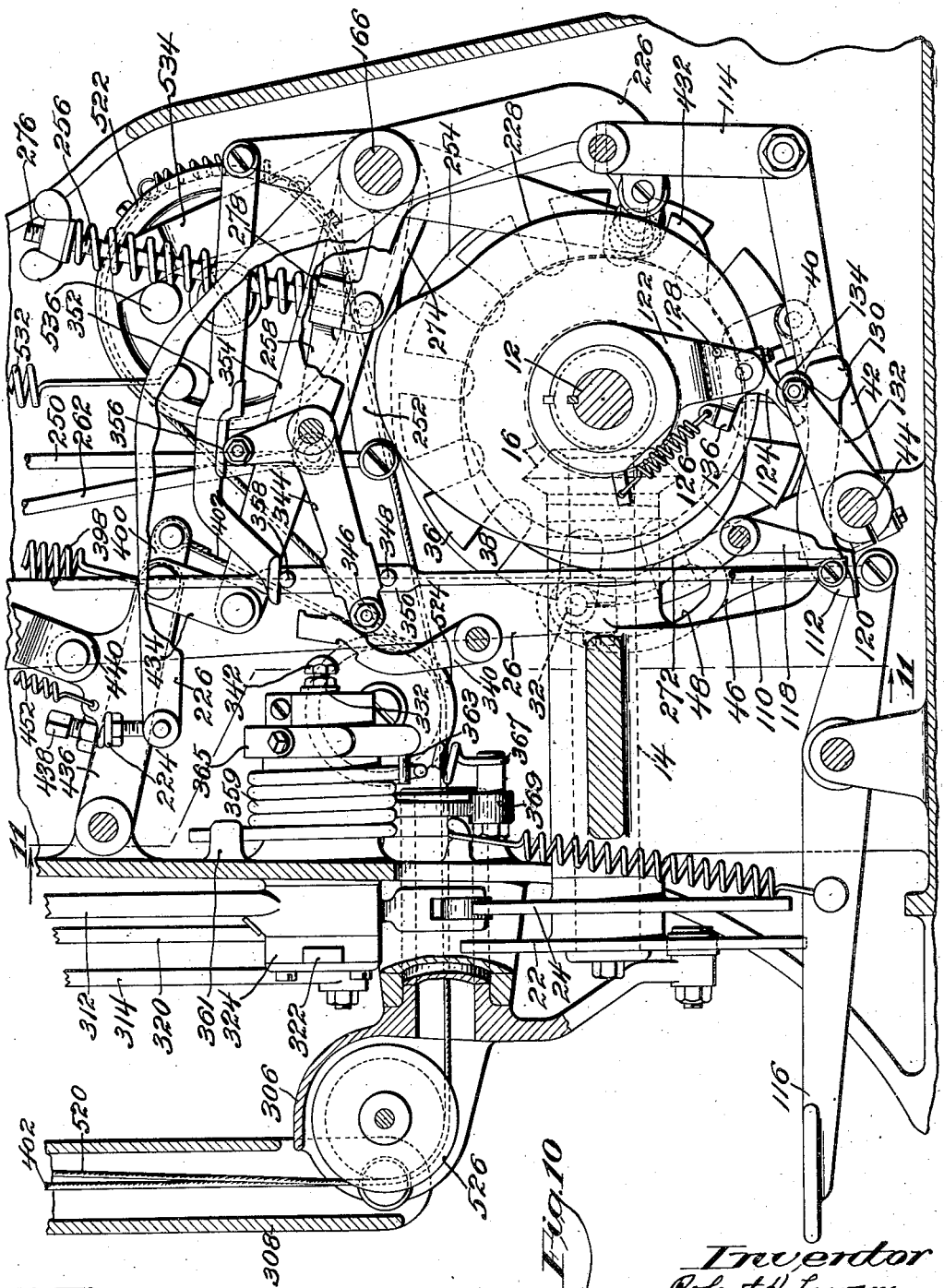
Figure 11:
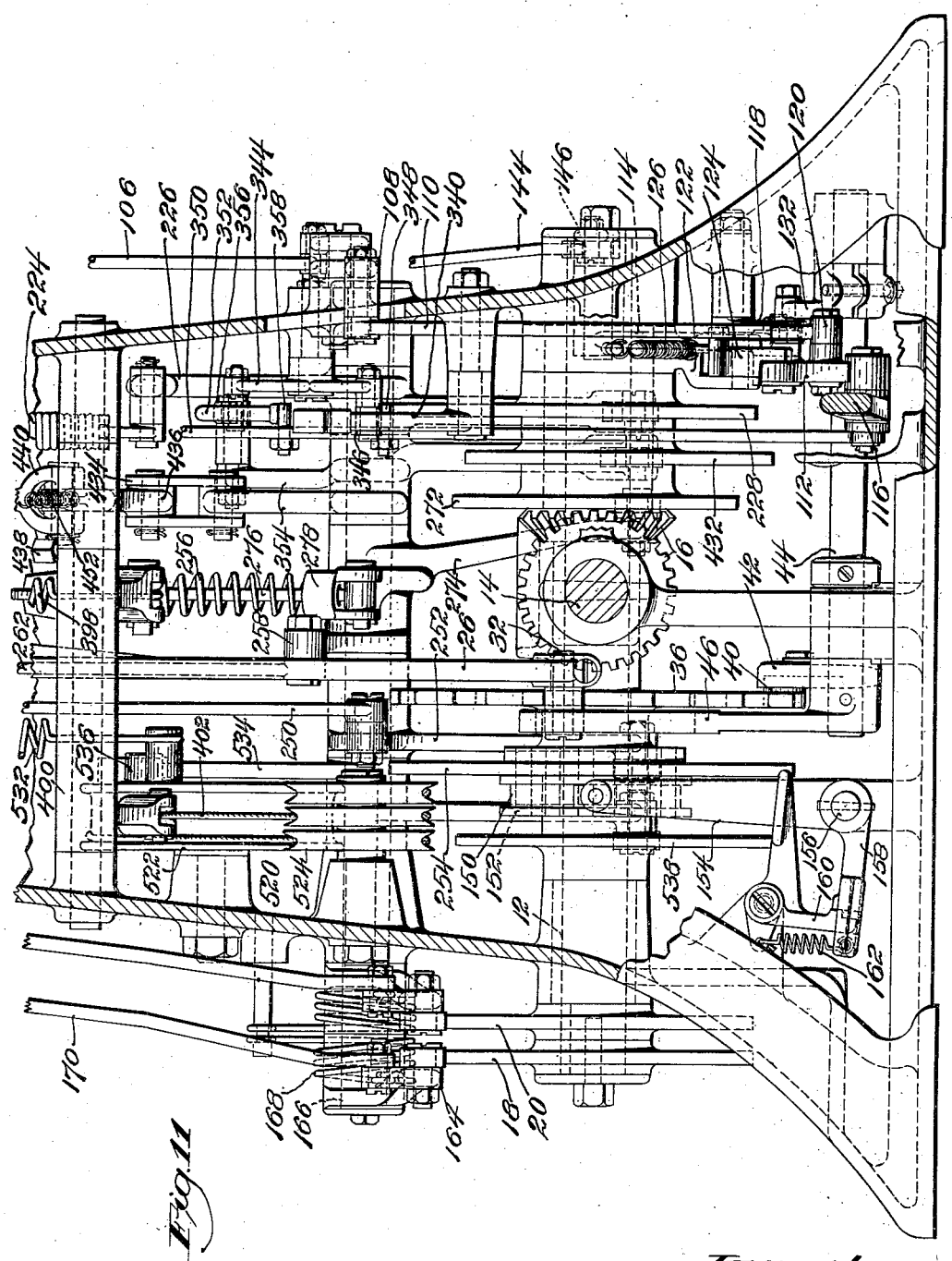
Figure 12:
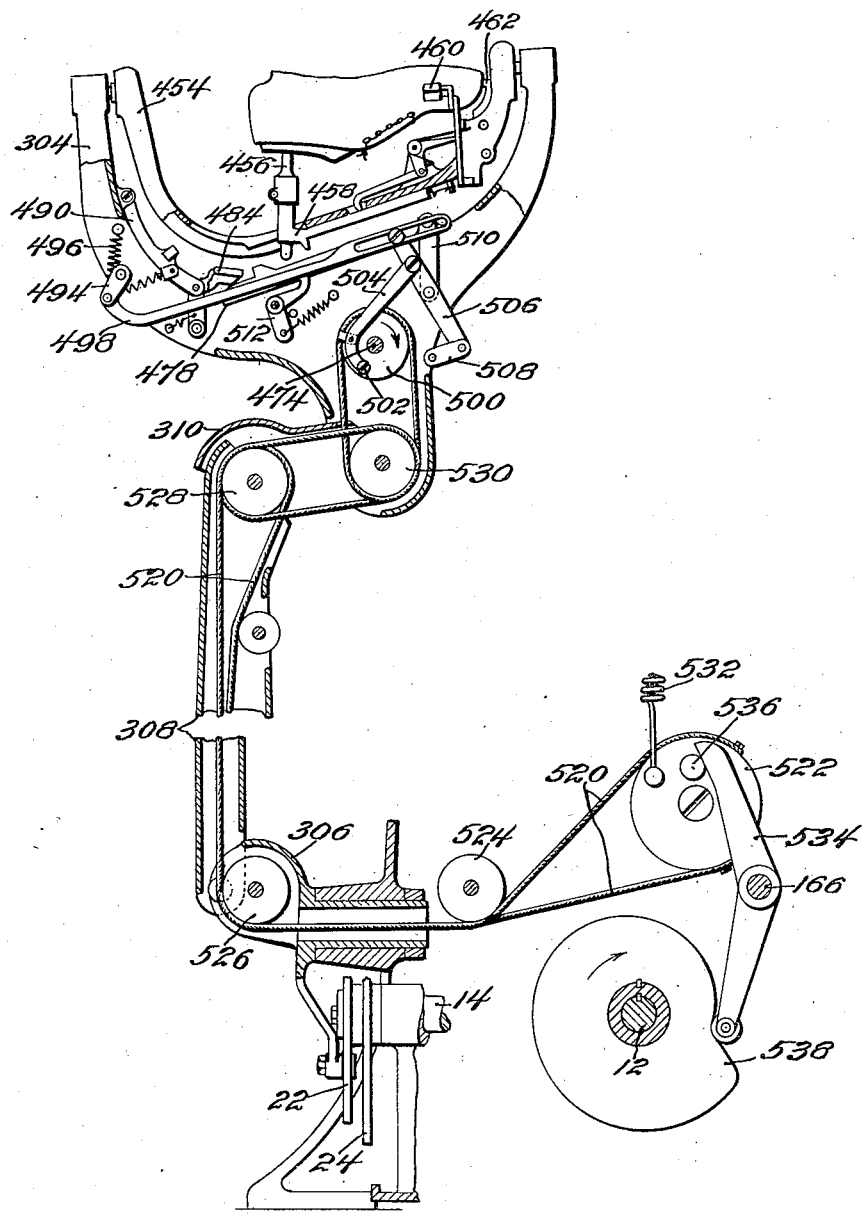
Figure 13:
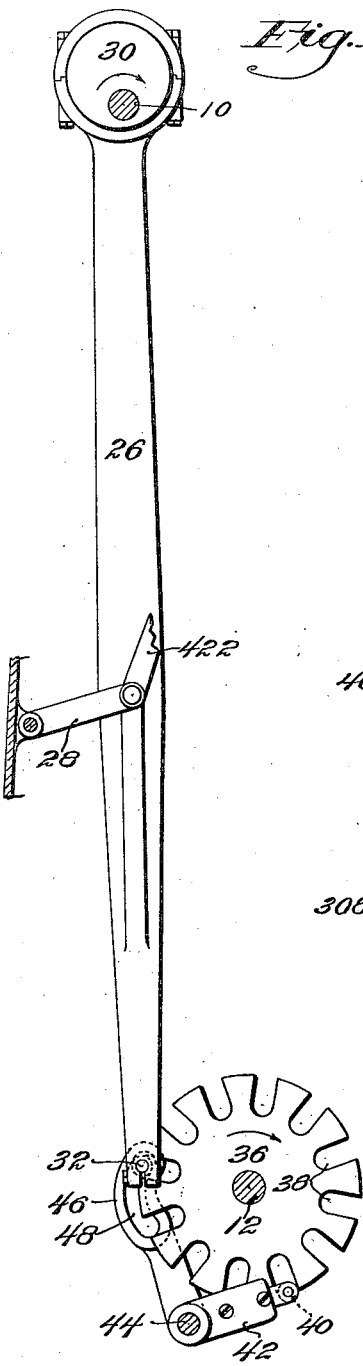
Figure 14:
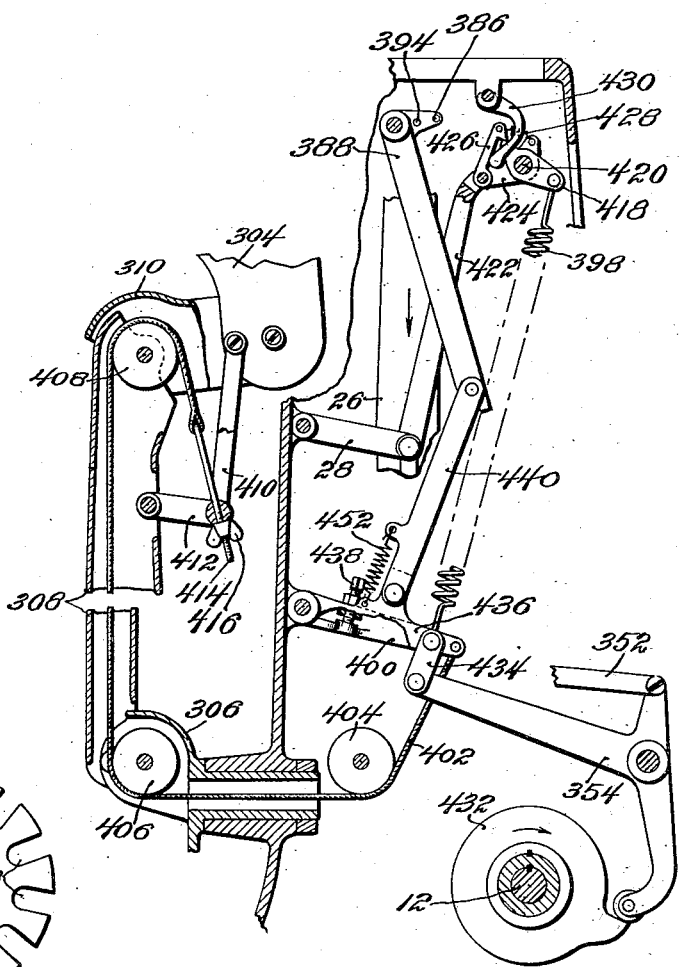
Figure 19:
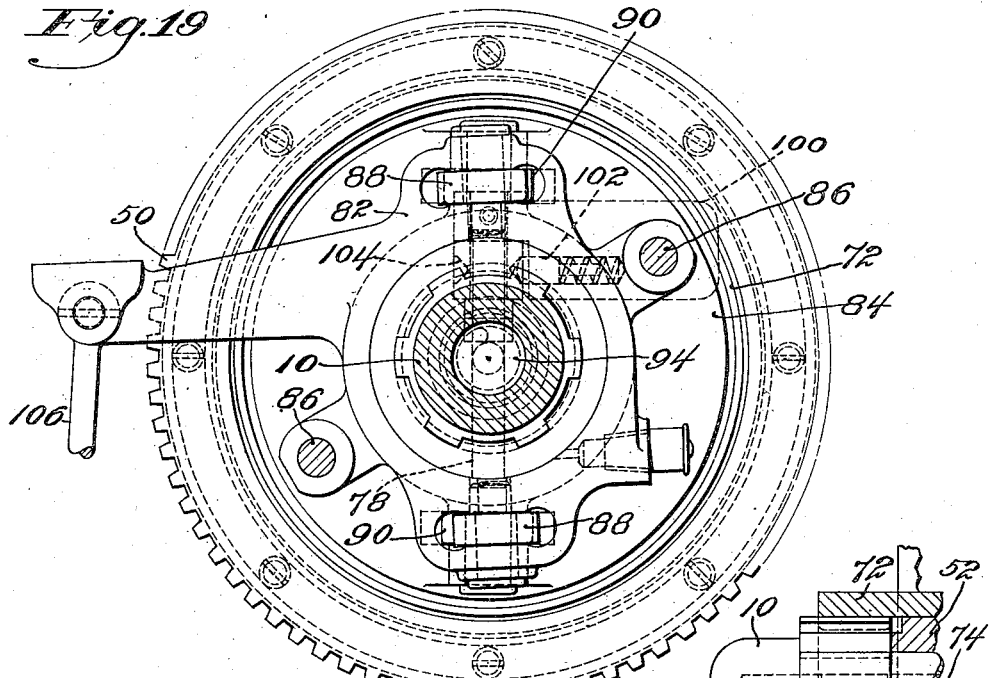
Figure 21:
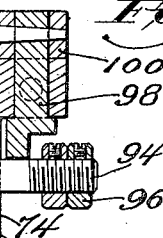
Figure 20:
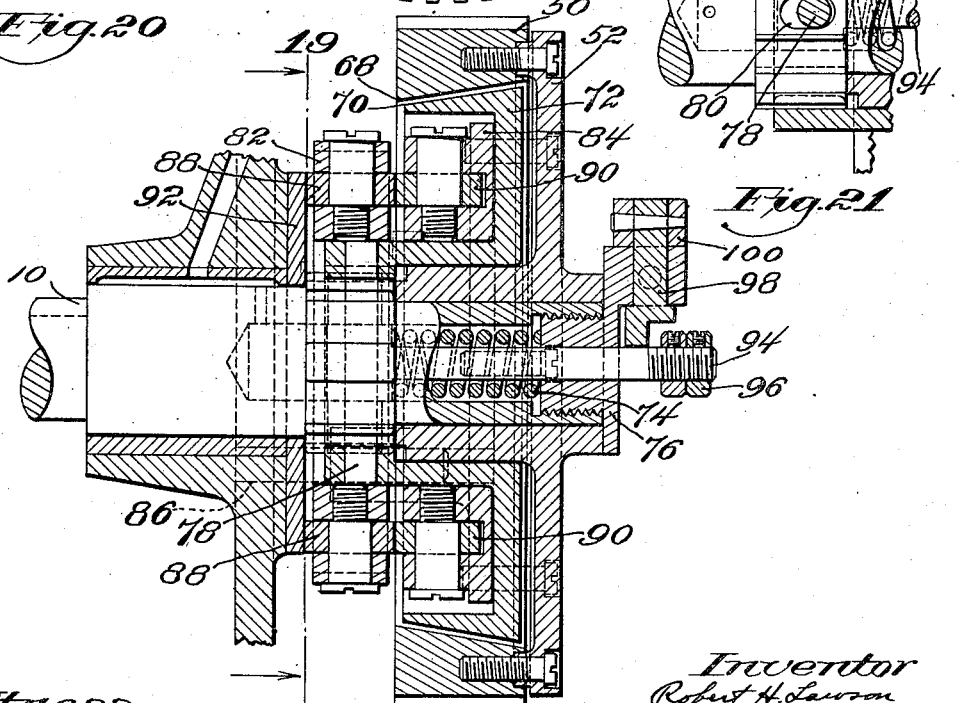
Figure 27:
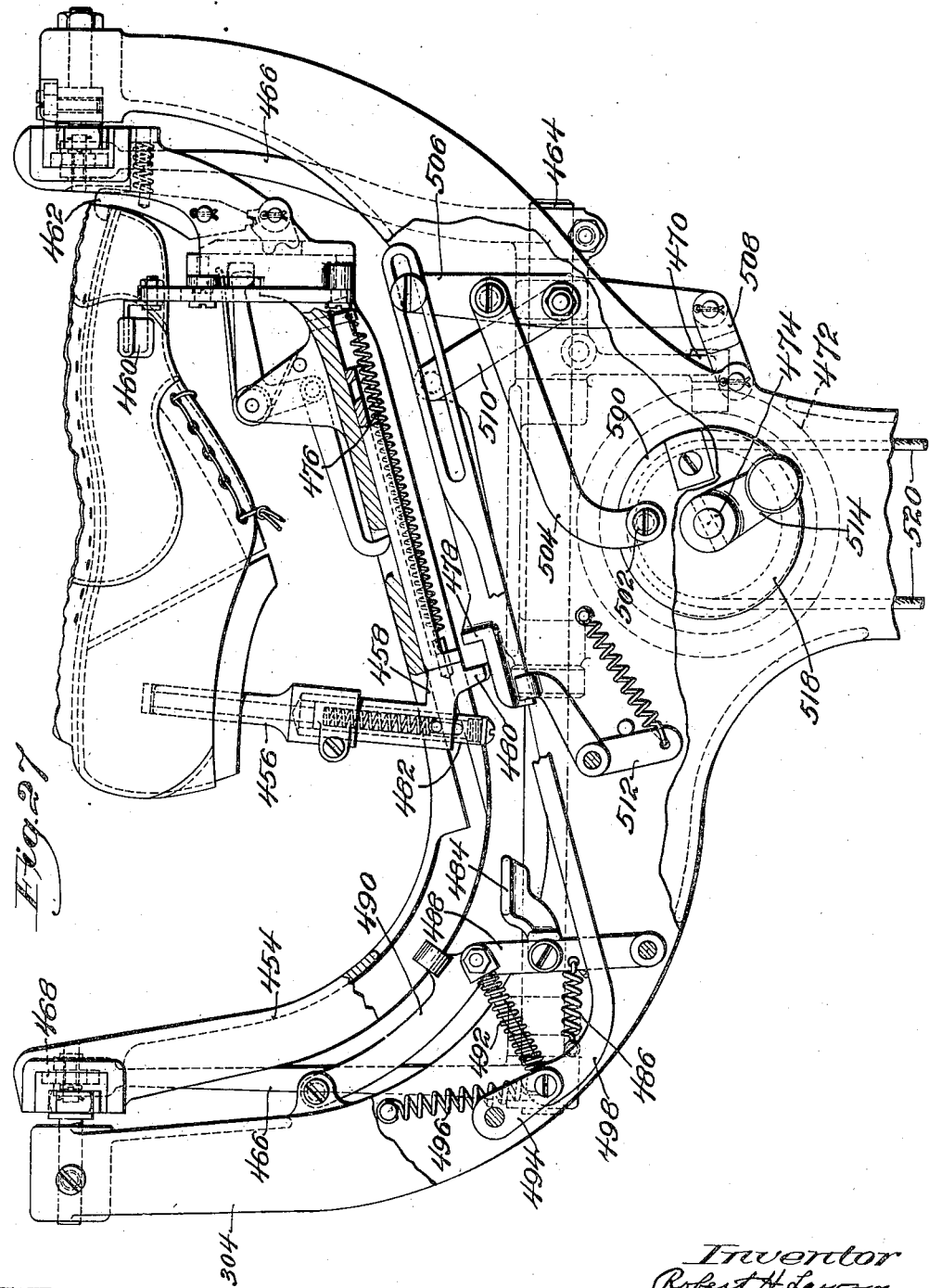

Other features of the present invention consist in certain devices, combinations and arrangements of parts hereinafter described and claimed, the advantages of which will be obvious to those skilled in the art from the following description taken in connection with the accompanying drawings in which Figure 1 is a view in front elevation of an automatic side lasting machine embodying the several features of the invention; Figure 2 is a view in right side elevation of the machine; Figure 3 is a view in left side elevation of the machine; Figure 4 is a view in front elevation of the upper portion of the machine with the shoe supporting jack omitted and with portions of the frame broken away to show underlying parts; Figure 5 is a view in right side elevation with a portion of the frame broken away, of the parts illustrated in Figure 4, taken on the line 5—5 of said figure; Figure 6 is a detail sectional view showing in right elevation a portion of the jack supporting structure and some of the connections which are actuated from the operating cam shaft and from the pattern cams; Figure 7 is a detail view illustrating particularly the mechanism for intermittently actuating the pattern cam shafts from the operating cam shaft; Figure 8 is a detail view of a portion of the mechanism shown in Figure 7, with the parts in a different position; Figure 9 is a sectional plan view of the mechanism in the base of the machine, taken on the line 9—9 of Figure 1; Figure 10 is a view in sectional elevation of the mechanism illustrated in Figure 9, taken on the line 10—10 of said figure; Figure 11 is a view in sectional elevation of the mechanism illustrated in Figure 10, taken on the line 11—11 of said figure; Figure 12 is a detail view illustrating particularly the jack supporting structure and the connections actuated from a pattern cam for operating mechanisms mounted in the jack frame, the base of the jack supporting structure having been broken and the jack with the upper portion of the jack supporting structure turned through an angle of 90 degrees; Figure 13 is a detail view illustrating a portion of the mechanism for intermittently actuating the pattern cam shafts; Figure 14 is a detail view illustrating the means for exerting an upward pressure during each feeding movement of the jack and for finally relieving this pressure at the end of the operation on the shoe to permit the jack to be depressed; Figure 15 is a detail view illustrating particularly the mechanism for actuating and controlling the upper tensioning grippers; Figure 16 is a detail sectional plan view of the interchangeable connections through which the lasting units are swung by their pattern cams; Figure 17 is a view in end elevation of the mechanism illustrated in Figure 16; Figure 18 is a view in side elevation of the mechanism illustrated in Figure 16; Figure 19 is a detail sectional view of the main driving clutch and brake taken on the line 10—10 of Figure 20; Figure 20 is a central longitudinal sectional view with the parts illustrated in Figure 19; Figure 21 is a detail view in side elevation partly in section of a portion of the mechanism shown in Figures 19 and 20; Figure 22 is a view similar to Figure 20 but with the parts in different positions; Figure 23 is a detail plan view of a portion of the clutch and brake actuating mechanism; Figure 24 is a view in front elevation of the parts illustrated in Figure 23; Figure 25 is a detail sectional view, taken on a vertical plane passing through the axis of a cam actuated lever forming a part of the connections for imparting feeding movements to the jack; Figure 26 is a detail sectional plan view of a portion of the mechanism illustrated in Figure 25; Figure 27 is a view in front elevation, partly in section, of the shoe supporting jack frame with a shoe in position on the jack and with the parts of the mechanisms mounted in the jack frame in the positions which they assume at the end of the operation on the shoe; Figure 28 is a view in front elevation of the parts illustrated in Figure 27, but with the jack supports in position to receive a new shoe; Figure 29 is a view, taken on line 29—29 of Figure 28; Figure 30 (Sheet 1) is a plan view of a portion of the machine illustrating the mechanism for swinging the lasting units; Figure 31 is a detail sectional view illustrating particularly a portion of the mechanism for actuating the upper tensioning grippers; Figure 32 is a sectional view, taken on the line 32—32 of Figure 31; Figure 33 is a view similar to Figure 31 with the parts shown in a different position; Figure 34 is a detail sectional view taken on the line 34—34 of Figure 33; and Figure 35 (Sheet 13) is a view similar to Figures 31 and 33, with the parts in still another position.

The machine illustrated in the drawings is an automatic side lasting machine and comprises two sets of upper tensioning and securing devices mounted as separate units in the head of the machine and arranged to act simultaneously upon opposite sides of a shoe. These units except as hereinafter described are the same in construction and mode of operation as the units disclosed in applicant's prior Patent No. 1,963,170 hereinbefore referred to. The machine also comprises a jack upon which the shoe is supported which is moved step by step during the lasting operation to present portions of the shoe upper along the sides of the shoe successively to the upper tensioning and securing devices. The machine also comprises an operating cam shaft from which the upper tensioning and securing devices are actuated, and a plurality of pattern cams from which the feeding movements are imparted to the jack and from which also the relative positions of the shoe and lasting units are controlled as the point of operation of the units is transferred along the shoe. Driving mechanism is provided from which the operating cam shaft and the pattern cams are driven in timed relation to each other, and a stopping mechanism which is actuated after the completion of the operation on the shoe and after certain other operations have been performed to bring the machine finally to rest.

In general, the operations performed by the machine both while the lasting operation is being performed and before and after the lasting operation are substantially the same as are performed by the machines disclosed in applicant's prior patents. These operations are as follows: During the lasting operation the jack is fed step by step, the lasting units are swung about axes substantially perpendicular to the sole of the shoe, the upward pressure of the jack is relieved during each feeding movement, the jack is tilted longitudinally about a transverse axis passing substantially through the points of operation of the lasting units, the outward pressure of the presser-foot with which the lasting units are provided against the rib of the insole is varied, the tension exerted by the grippers on the upper is varied, the grippers are held out of operation during one or more cycles of operation of the upper securing devices, the shoe is moved laterally with relation to its supporting means on the jack frame, and the mechanism by which the shoe is unclamped at the conclusion of the lasting operation is reset. Before the machine is put in operation, the jack is in a position away from the lasting units at one side of the line of feed, and is in condition to receive a shoe. When a shoe is placed on the jack and pressed down, a catch which controls the automatic shoe clamping mechanism of the jack is released, and the shoe is clamped on the jack. A movement of the jack into position to receive the first staple adjusts the feeding mechanism of the jack for the size of the shoe which is to be operated upon, adjusts the lateral position of the lasting units and releases the spring which produces the upward pressure of the jack, which spring is locked out of operation by the previous outward movement of the jack.

The depression of the starting treadle locks the feed adjustment, releases the lasting units permitting them to separate, and closes the driving clutch. At the conclusion of the final operation of the upper securing device which, in the illustrated machine, are staple forming and inserting devices, and during approximately the last half revolution of the operating cam shaft, the revolution of the pattern cams is completed, and the pattern cams at this time, through suitable connections, relieve the upward pressure on the jack, allowing it to drop slightly, impart a return back feed movement to the jack, move the jack outwardly, move the lasting units towards each other, and simultaneously render operative the mechanism through which the lateral position of the units is adjusted when the jack is again moved to operative position, unclamp the shoe on the jack and reset the automatic shoe clamping mechanism, unlock the feed adjustment, open the driving belt, and apply the brake.

Referring to the drawings, the lasting units are indicated at 2 and as in the machine of Patent No. 1,963,170 comprise supports in which are mounted the guiding presser-foot 4, the upper securing devices indicated generally at 6, and the upper tensioning grippers 8. The operating cam shaft is indicated at 10 and is located with relation to the lasting units substantially as in the machine of Patent No. 1,963,170. The upper tensioning and securing devices, except as hereinafter described, are substantially the same as in the machine of Patent No. 1,963,170 and are actuated in substantially the same manner from the operating cam shaft 10 with the exception that the securing devices comprise staple forming and driving mechanisms only, the tack supplying and driving mechanisms of the patented machine being omitted.

The pattern cams of the illustrated machine are located in the base of the machine. To provide a simple and compact arrangement and to permit an easy substitution of one form of cam for another, as required for shoes of different shapes, the pattern cams are mounted upon two shafts arranged horizontally and at right angles to each other. The pattern cam shafts are indicated at 12 and 14 and are connected to rotate in unison by bevel gears 16. The shaft 12 at its left hand end, as viewed from the front of the machine, extends beyond its bearing, outside of the base, and upon this projecting end of the shaft two of the pattern cams indicated at 18 and 20 are secured so as to be readily removable axially of the shaft. Likewise the shaft 14 at its forward end extends beyond its bearing outside of the base and upon the projecting end of this shaft are removably secured two pattern cams 22 and 24. Provision is thus made whereby the cams differing most in shape for shoes of different styles can be changed conveniently and quickly, and the necessity of supporting and driving a large number of substitute cams in the machine is avoided.

The pattern cam shafts are driven through a single revolution during one complete operation of the machine. While the upper tensioning and securing devices are acting progressively along the shoe, the pattern cam shafts rotate in timed relation to the operating cam shaft, but necessarily at a very much slower speed. In order to permit the pattern cams to perform the additional operations, such as returning the jack, moving it outwardly, unclamping the shoe, etc., the pattern cam shafts continue to rotate after the lasting of the shoe has been completed.

In the present machine the continued rotation of the pattern cam shaft is accomplished without interrupting the driving connection between the operating cam shaft and the pattern cam shafts, the shape of the pattern cams, and the construction and arrangement of the connections actuated by the cams and the mechanism for driving the cams being such that a sufficient movement is imparted to the cams to accomplish the desired results during the final revolution of the operating cam shaft. To this end the pattern cam shafts 12 and 14 are driven intermittently from the operating cam shaft 10, each forward movement being produced during a single revolution of the operating cam shaft, and the final movement being sufficient to cause the performance of the additional operations after the shoe has been lasted. The driving connections between the operating cam shaft 10 and the pattern cam shafts comprise an oscillating and longitudinally moving lever 26, (see Figs. 7, 8 and 13) pivotally supported about midway its length on one end of a link 28, the other end of which is pivoted on the machine base. At its upper end the lever 26 is provided with a strap surrounding an eccentric 30 on the operating cam shaft 10, and at its lower end with a disk actuating pin 32, the construction being such that during each revolution of the operating cam shaft the pin 32 is moved in an approximately elliptical path, as indicated by the dotted line 34 in Figure 8. Cooperating with the vibrating lever 26 is a disk 36 secured to the pattern cam shaft 12 and provided with a series of radial slots 38 spaced at equal distances about its periphery and arranged to be engaged successively by the pin 32 on the lever 26. The pin 32 moves in the direction of the arrows applied to the dotted line 34 in Figure 8, and during each traverse of its path, enters and leaves a slot 38, thereby moving the disk 36 forward one step and bringing the next slot into position to be engaged by the pin 32 during its next traverse. A roll 40 mounted on an arm 42, see Fig. 13, secured to a rock shaft 44 is moved into a slot 38 of the disk as the pin 32 leaves the disk and locks the disk in position until again engaged by the pin. The shaft 44 is rocked to move the roll 40 into and out of engagement with the disk by means of an arm 46 provided with a curved cam slot 48 engaged by the pin 32.

The driving mechanism of the machine comprises a single clutch, the driving member of which is a gear rim 50 secured to a disk 52 mounted so as to be capable of rotating freely on the operating cam shaft 10. The gear rim 50 is rotated continuously by an electric motor 54 mounted on an adjustable bracket 56 at one side of the machine base through connections comprising a belt 58 passing over pulleys 60 and 62, a gear 64, driven by the pulley 62, and an intermediate gear 66 meshing with the gear 64 and with the gear rim 50. The clutch surface of the driving member, as indicated at 68, Fig. 20, is formed on the inner surface of the rim 50 and is arranged to cooperate with the clutch surface 70 of the driven member of the clutch indicated at 72. The member 72 is in the form of a disk provided with a rim bearing the clutch surface 70 and with a sleeve-like hub journaled upon the hub of the disk 52. At the side remote from the disk 52 the hub of the driven clutch member 72 projects beyond the hub of the disk 52 and is connected to the operating cam shaft 10 by a series of splines as best shown in Fig. 21. The driven member of the clutch is thus connected to rotate with the shaft 10 and is movable axially of the shaft into and out of engagement with the driving member 50 of the clutch. To move the driven member 72 of the clutch towards the driving member 50 and close the clutch, a spring 74 is provided, located in the hollow end of the shaft 10 and interposed between a screw plug 76 closing the end of the shaft and a cross pin 78 extending diametrically across the splined portion of the hub of the driven member 72 and passing through longitudinal slots 80 in the shaft 10. The driven member of the clutch is moved away from the driving member to open the clutch and simultaneously a brake is applied to the driven member to stop the rotation of the operating cam shaft 10 by mechanism controlled from a pattern cam shaft and comprising an actuating member 82 and a clutch opening and brake applying member 84. The member 84 is in the form of a disk and is mounted in the recess between the hub and rim of the driven member 72. The member 84 is free to slide axially of the hub of the driven member but is held from rotation by stationary restraining and guiding pins 86 projecting from the frame of the machine through perforations in the member 84. When moved to the right, as viewed in Fig. 20, the member 84 presses against the driven member and moves the driven member to the right against the force of spring 74 to open the clutch. The contacting surfaces of the member 64 and driven member 72 exert a frictional drag on the driven member due to the force of spring 74, and thus the member 64 acts both as a means for opening the clutch and as a means for applying a brake to stop the rotation of the operating cam shaft 10 as soon as the clutch surfaces 68 and 70 are separated. The member 84 is moved to open the clutch and apply the brake by the actuating member 82 which comprises a disk portion mounted to turn freely upon the hub of the driven clutch member 72. At diametrically opposite points on the member 82 rolls 88 are mounted to rotate upon radially extending axes, which rolls, by a rotative movement of the member 82 are arranged to engage rolls 90 similarly mounted in the member 84. The rolls 88 travel in contact with a thrust resisting plate 92 mounted on the machine frame on the opposite side of the actuating member 82 from the member 84, the arrangement being such that a movement of the actuating member 82 in a clockwise direction from the position illustrated in Fig. 24 to the position illustrated in Fig. 19 forces the member 84 to the right, as viewed in Fig. 20, thereby forcing the braking surface on the member 84 against the cooperating surface on the driven clutch member 72, and simultaneously moving the member 72 to the right to open the clutch, as indicated in Fig. 20. A movement of the actuating member 82 in a counter-clockwise direction from the position illustrated in Figs. 19 and 20 moves the rolls 88 out of engagement with the rolls 90, thereby relieving the pressure of the braking surfaces and allowing the spring 74 to move the driven member 72 to the left and close the clutch, as indicated in Fig. 22. As a means for retaining the clutch in open position with the braking pressure relieved, a rod 94 is provided extending axially of the shaft 10 through the spring 74 and plug 76. The inner end of this rod is formed with a head through which the pin 78 connected to the driven member 72 of the clutch passes, and the outer end of the rod is provided with nuts 96 forming a head arranged to be engaged by the lower end of a stop pin 98. The lower end of the pin projects into the path of the head formed by the nuts 96, and is cut away on one side so that in its normal position, as illustrated in Figs. 20 and 22, it does not interfere with the movements of the rod 94 as the clutch is opened and closed. A partial rotation of the pin, however, brings it into contact with the nuts 96 and moves the rod and with it the driven member 72 a sufficient distance to the right to relieve the braking pressure and maintain the clutch in open position. An operating handle 100 is secured to the upper end of the pin 98 and is provided with a spring pressed locking pin 102 arranged to engage either of two locking recesses 104 (see Fig. 19) formed in the plug 76 in which the pin 98 is mounted.

In starting the machine the actuating member 82 of the clutch and brake mechanism above described is actuated directly from the starting treadle by the operator to close the clutch and release the brake. The stopping of a machine of the type illustrated, however, is necessarily under the control of a pattern cam shaft and, in order to cause the clutch of the illustrated machine to be opened with certainty and at the required point in the revolution of the operating cam shaft and still be controlled from a pattern cam shaft rotating at a very much slower speed, mechanism for causing a movement of the actuating member 82 in a direction to open the clutch has been provided comprising parts which are moved into operative position during the final movement of the pattern cams and which are then actuated by the operating cam shaft to impart the required movement to the member 82.

The treadle actuated connections for moving the actuating member 82 in a counter-clockwise direction to open the clutch comprise a rod 106 connected at its upper end to a horizontal arm of the member 82 and at its lower end to the rear end of a lever 108, see Fig. 7, the forward end of which is connected to the upper end of a rod 110. At its lower end the rod 110 is connected to the forward end of a link 112 supported at its rear end from the machine base by a link 114. The forward end of the link 112 extends over the rear end of the treadle lever 116 and the arrangement is such that a depression of the treadle raises the rod 110 and through the lever 108 depresses the rod 106 and swings the member 82 in a clockwise direction to cause the clutch to close. To hold the clutch closed until all of the operations performed by the machine are completed, a latch 118 is arranged to engage a lug 120 on the link 112 and retain the rod 110 in its raised position.

The mechanism for causing the clutch to be opened to stop the machine comprises devices moved into operative position by the pattern cam shaft 12 and actuated from the operating cam shaft 10 to move the lug 120 out of engagement with the latch 118, see Figs. 7, 8 and 10. These devices include an arm 122 secured to the pattern cam shaft 12 and a bell crank 124 pivotally mounted on the outer end of the arm. During the greater portion of the revolution of the shaft 12 the bell crank 124 is yieldingly held with relation to the arm 122, in the position indicated in Fig. 7 by a spring 126 connected to one arm of the bell crank, the movement of the bell crank under the force of the spring being limited by a stop pin 128 engaging one end of a flat surface on the hub of the bell crank. As the shaft 12 makes its last step in completing its movement an arm of the bell crank is brought into engagement with a lug 130 projecting from the side of the link 112 and the bell crank is moved with relation to the arm 122 to the position indicated in Fig. 8. With the parts in this position, the connections actuated from the shaft 10 become operative, which connections comprise an arm 132 secured to the rock shaft 44 and a roll 134 at the outer end of the arm. The shaft 44 is rocked through connections from the operating cam shaft 10, as hereinbefore described, and this rocking movement, as soon as the bell crank 124 has been brought to the position indicated in Fig. 8 causes the roll 134 to engage a lug 136 on an arm of the bell crank and swing the bell crank in a direction to move the link 112 lengthwise to the left, as viewed in Figs. 7, 8, and 10, and disengage the lug 120 on the link from the latch 118. This disengagement of the lug 120 from the latch 118 permits the actuating member 82 of the clutch mechanism to be moved in a counter-clockwise direction to open the clutch, and this movement is produced by the action of a spring 138 connected to the rod 106 and exerting an upward pull on the rod. The movement of the member 82 under the force of the spring 138 is limited by a yielding stop plunger 140 mounted on the machine frame above the arm to which the rod 106 is connected.

To permit the operator to stop the machine at any time as may be necessary or desirable a hand lever 142, see Fig. 2, is mounted at one side of the machine base near its upper end and is connected by a rod 144 to a horizontal arm 146 secured to the pivot of the link 114. The arm 146 and the link 114 in effect form a bell crank, the movement of which reciprocates the link 112 to release the lug 120 from the latch 118. A spring 148 connected to arm 146 tends to move the arm downwardly and a pin and slot connection between the arm and the rod 144 permits an independent upward movement of the arm when the machine is stopped by the automatically acting mechanism above described.

It is sometimes desirable to rotate the operating cam shaft without actuating the pattern cams, and to secure this result in the illustrated machine the slotted disk 36 is mounted on the shaft 12 so as to be capable of rotating independently of the shaft and is detachably connected to the shaft by means of a pin clutch comprising a disk 150, see Fig. 11, mounted to rotate with and slide longitudinally on the shaft and provided with pins 152 arranged to enter holes in the flanged hub of disk 36. The disk 150 is provided with a peripheral groove engaged by a roll at the upper end of an arm 154 secured to a rock shaft 156 to which is also secured a horizontally extending treadle lever 158. A depression of the treadle lever moves clutch disk 150 away from the disk 36 and leaves the disk 36 free to rotate without transmitting its motion to the pattern cam shafts. The clutch disk 150 may be held in its disconnecting position by a latch lever 160 urged in a direction to engage the treadle lever 158 by a spring 162 connecting a lug on the hub of the latch lever and the outer end of the treadle lever, which spring, by exerting an upward pull on the treadle lever 158 also normally holds the clutch disk 150 in its connecting position. A horizontal arm of the latch 160 is provided with a treadle by which it may be conveniently actuated to release the treadle lever 158.

The mechanism of the illustrated machine for swinging the lasting units about axes substantially perpendicular to the sole of the shoe being operated upon comprise the two pattern cams 18 and 20 and connections between these cams and the units having provision whereby the connections may be interchanged for operation on right and left shoes. As a result of this interchange, one unit will be operated from the cam 18 during the lasting of a right shoe and from the cam 20 during the lasting of a left shoe while the other unit will be operated from the cam 20 during the lasting of a right shoe, and from the cam 18 during the lasting of a left shoe. The trains of connections between the cams 18 and 20 and the lasting units are duplicates of each other and each comprises a cam lever 164 mounted upon a pivot shaft 166 and pressed towards the cam by a spring 168 coiled around the hub of the lever. From the outer end of the lever 164 a rod 170 extends upwardly and is connected to the outer end of a link 172, the inner end of which is connected to an adjusting lever 174. Above the rod 170 and substantially in line therewith is an upwardly extending rod 176 the lower end of which is pivoted on the outer end of a supporting link 178 and the upper end of which is connected to the horizontal arm of a bell crank 180. A rod 182 connects the vertical arm of the bell crank 180 with a horizontally arranged bell crank 184, see Fig. 30, and a rod 186 connects the bell crank 184 with a lasting unit 2. To permit the connections from the pattern cams 18 and 20 to be interchanged, the lower ends of the rods 176, see Figs. 17 and 18, are formed with heads arranged one behind the other and provided on opposite sides with grooves 188 arranged to receive rolls 190 mounted on the pivot pins connecting the rods 170 with the links 172. The grooves 188 and rolls 190 are arranged to permit each roll to be shifted from a groove in one rod 176 to a groove in the other rod and, when so shifted, the lasting unit which was swung through the connections described by one of the pattern cams 18 and 20 will be swung by the other cam. To move the rolls 190 simultaneously in opposite directions, the adjusting levers 174 are provided at their lower ends with slots 192 inclined with relation to each other which are engaged by a pin 194 on a hand lever 196. A movement of the hand lever swings the levers 174 simultaneously in opposite directions through the pin and slot connection 192, 194, and shifts each roll 190 from one rod 176 to the other. The hand lever 196 is locked at the limit of its movement in each direction by a locking pin 198 mounted in the lever and arranged to enter perforations in a fixed plate 200. The head of the pin 198 is engaged by a spring pressed lever 202 mounted on the hand lever 196 by which the pin is forced into a perforation and by which the pin can be readily withdrawn by the operator.

The mechanism of the illustrated machine for varying the outward pressure of the guides 4 of the lasting units against the rib of the insole has the same mode of operation as the corresponding mechanism disclosed in Patent No. 1,963,170 but is of somewhat simpler construction. The units are connected by links 204 to the opposite ends of a lever 206 secured to a shaft 208 mounted in the machine frame, see Figs. 4 and 5. To the shaft 208 is also secured an arm 210 which is connected by a rod 212 to an arm 214 secured to a shaft 216 to which shaft is also secured an arm 218. To the arm 218 is secured the upper end of a vertical rod 220, the lower end of which is supported by a link 222 and is connected to the upper end of a spring 224, the action of which is to exert a downward pull on the rod 220 and through the connections described separate the lasting units to hold the guiding presser feet 4 yieldingly against the insole rib. To vary the pressure of the guiding feet against the rib, the lower end of the spring 224 is connected to one end of a lever 226, see Fig. 10, the other end of which engages a pattern cam 228 on the shaft 12.

As has been stated, the illustrated machine embodies new and improved means for controlling the action of the upper tensioning grippers. The mechanism for controlling the grippers comprises a lever 230 pivotally mounted midway of its length on a cam actuated lever 232, see Fig. 15, and connected at its forward end to the grippers through the cross head 234, links 236, sliders 237, and jaw actuating links 238 as in the machines of applicant's prior patents. The rear end of the lever 230 is pivotally connected at 240 to the upper end of a rod 242 and during the movements of the cam lever 232 the lever 230 swings about the pivot 240 which constitutes the fulcrum of the lever. To cause the grippers to exert a yielding pull on the shoe upper, the fulcrum 240 of the lever 230 is yieldingly supported against upward movement during the upward movement of the grippers, and in order to limit accurately the downward movement of the grippers the fulcrum 240 is positively held against downward movement during the downward movement of the grippers. To secure this result the rod 242 is connected at its lower end to the forward end of a lever 244, the rear end of which is yieldingly supported against downward movement by a spring 246. The upward movement of the rear end of lever 244, and consequently the downward movement of the fulcrum 240 of the lever 230 is positively limited by stop nuts 248 at the upper end of a rod 250 passing through a block pivotally mounted on the lever 244, the lower end of which rod is connected to one arm of a lever 252. The other arm of the lever 252 engages a pattern cam 254 on the pattern cam shaft 12 and thus the pattern cam 254, through the connections described, acts as an adjustable stop to control the downward movements of the fulcrum 240 and consequently the downward movements of the grippers. By the use of a suitably shaped pattern cam, the extent of the downward movements of the grippers may be varied as may be desirable as, for instance, in order to suspend the operation of the grippers during one or more cycles of operations of the upper attaching devices.

During each upward movement of the grippers, a tension on the upper is produced by the action of the spring 246. At certain points on the shoe this tension is increased by an additional spring, and in order that this increase in tension may be varied to cause the grippers to exert a varying tension at different points along the shoe, the action of this additional spring is controlled by a pattern cam. The additional spring is indicated at 256, Fig. 15, and is arranged to act on an arm 258 mounted on the pivot shaft 166. The arm 258 is connected by a rod 262 to an arm 264 pivotally mounted on the machine base and provided at its free end with a pivotally mounted block 266 through which a vertical rod 268 passes. The upper end of the rod 268 is connected to the forward end of lever 244, and the lower end of the rod is provided with stop nuts 270, the arrangement being such that when the stop nuts are brought into contact with the block 266, the force of spring 256 is added to that of spring 246 in resisting the upward movement of the fulcrum 240 of the gripper actuating lever 230. The pattern cam which controls the spring 256 is indicated at 272. This cam is engaged by one arm of a cam lever 274 mounted on the pivot shaft 166. To the other arm of the lever 274 is pivotally connected the lower end of a rod 276 which passes through a lug 278 on the arm 258 and is surrounded by the spring 256 interposed between the lug and an adjustable nut on the upper end of the rod.

The actuating link 238 of each gripper is provided, as in the machines of applicant's prior patents, with a pin 280 engaging relatively inclined slots in the jaw members 282 and 284. During the normal operation of the machine the pin 280, during the up and down movements of the actuating member 238 moves with relation to the jaws to close or open the jaws and then moves the jaws away from or towards the shoe, the jaws being held from bodily movement while being closed or opened by the frictional engagement of a spring pressed plunger 286 with an upward extension of the jaw member 282. As has been described, the grippers of the present machine are thrown out of operation during one or more cycles of operation of the upper securing devices by varying the movement of the grippers towards the shoe. In order to ensure against any possible engagement of the gripping jaws with the upper at this time, a latch 288 is provided for connecting the jaws to the actuating member whereby no movement of the actuating member relative to the jaws is permitted and the jaws remain open during any to and fro movement of the member.

The latch 288 is pivotally mounted on the pivot connecting the jaws and is provided with a hooked end arranged to engage a shoulder 290 formed on the lower end of the actuating member 238. The latch is yieldingly forced in a direction to engage the shoulder by means of a spring 292, see Figs. 32 and 33, acting on a pivotally mounted arm 294 connected by a link 296 to the latch. During the normal operation of the machine, when the actuating member is at the limit of its upward movement, as indicated in Fig. 32, the hooked end of the latch bears against the actuating member below the shoulder 290. As the actuating member moves downwardly to open the gripper, the shoulder 290 is carried below the hooked end of the latch which moves in over the shoulder in position to prevent relative movement of the jaws and actuating member during the next upward movement of the member. To move the latch out of the path of the shoulder 290, an adjustable fixed stop pin 298 is arranged to be engaged by a horizontal arm of the latch as the gripper reaches its lowest position, as indicated in Fig. 31. The latch remains in this position during the upward jaw closing movement of the actuating member, which movement is sufficient to bring the shoulder 290 above the hooked end of the latch. When the normal down movement of the actuating member 238 is decreased, as hereinafter described, the horizontal arm of the latch 288 does not engage the stop pin 298, and consequently on the next upward movement of the actuating member, the gripping jaws remain open and are given an upward inoperative movement to the position somewhat higher than normal. In the machine illustrated, the grippers are rendered inoperative while the last two pairs of upper securing staples are being inserted near the tip line of the shoe, and to secure this result the pattern cam 254, Fig. 15, is provided with a low portion indicated at 300 which is brought under the end of the follower on the cam lever 252 when the pattern cam shaft 12 is given the next to the last step of its rotation and is provided with a still lower portion indicated at 302 which is brought under the cam follower by the last step in the rotation of the pattern cam shaft. The change in the position of the fulcrum 240 of the gripper actuating lever 230 due to the action of the portion 300 of the cam 254 shortens the downward stroke of the grippers sufficiently to prevent actuation of the latch 288 and also causes the grippers to be raised to a point higher than normal during the next upstroke of the grippers. The portion 302 of the cam 254 insures an idle movement of the grippers at a higher lever than normal with the jaws open during the final cycle of operations of the staple forming and driving devices.

The spring pressed plunger 286, which engages the upward extension of the jaw member 282 of a gripper, is housed in a pivotally mounted casing 301, Fig. 32, through which the upward extension of the jaw member 282 passes. The gripping jaws are thus supported so as to be capable of a transverse swinging movement as in the machines of Patents Nos. 1,854,204 and 1,963,170. In order to guide the gripping jaws accurately in their updraw movements away from the shoe sole and in their return movements to upper grasping position, the illustrated machine is provided with an adjustable guide consisting of an eccentrically mounted pin 303 arranged to engage one side of the jaw member 282. Means are also provided for pressing the jaw member 282 yieldingly against the pin 303 during the updraw and return movements of the gripper and, for this purpose, the latch actuating spring 292, arm 294, and link 296 are utilized, these parts being arranged to exert a yielding pressure on the jaw member 282 tending to hold it in contact with the guideway pin 303.

The upper securing devices of the illustrated machine comprise the staple forming and driving mechanisms disclosed in Patent No. 1,963,170. As fully described in said patent, and in Patent No. 1,854,204, these devices also include a wiper which acts to force the tensioned upper inwardly over the insole and against the insole lip. During this wiping action the gripping jaws swing inwardly and, in the illustrated machine, in order to avoid any injury to the upper, means are provided for producing this swinging movement independently of the action of the wiper on the upper. To this end a cam plate indicated at 305 is formed on or secured to the wiper carrier and is arranged to engage the gripping member 284 substantially opposite its pivotal connection with the member 282 during the wiping movement of the upper and impart a positive swinging movement to the gripping jaws inwardly over the sole edge.

The shoe supporting jack of the illustrated machine and the mechanism mounted in the jack are similar in many respects to those disclosed in applicant's prior Patent No. 1,999,298. A new and improved jack supporting structure, however, has been provided together with new and improved means for controlling the movements of the jack and for actuating the mechanism mounted in the jack frame.

The jack frame is indicated at 304. The supporting structure for the jack frame comprises a base 306 provided with an upwardly extending arm 308, and a horizontally extending link 310, one end of which is pivotally connected to the upper end of the arm 308 and the other end of which is pivotally connected to and supports the jack frame. The base 306 is pivotally mounted upon the base of the machine to swing about an axis extending transversely to the direction of feed and substantially parallel with the plane of the bottom of the shoe supported on the jack, and the pivots connecting the link 310 with the arm 308 and with the jack frame are parallel with the axis of the base 306. The jack frame is thus supported firmly in position, but can be readily moved to feed the shoe and maintain the shoe in the proper position with relation to the upper tensioning and securing devices at all times during the operation on the shoe. To permit a slight lateral movement of the jack frame during the lasting operation and also to permit a movement of the jack frame into and out of operative position with relation to the upper tensioning and securing devices, the arm 308 is pivotally mounted at its lower end on the base 306 to swing about a horizontal axis at right angles to the pivotal axis of the base.

Feeding movements are imparted to the jack frame 304 through connections actuated by the pattern cam 24. These connections comprise a cam lever 312, a link 314 having its lower end adjustably connected to the lever 312 in a manner to be described and having its upper end connected to the horizontal arm of a bell crank 316, and a link 318 connecting the vertical arm of the bell crank to the jack frame.

To vary the extent of the individual feeding movements for shoes of different sizes, means are provided for adjusting the distance from the pivot of the cam lever 312 of the lower end of the motion transmitting link 314. This means comprises a supporting link 320 pivotally connected at its lower end to the link 314 and pivotally mounted at its upper end on the lever 312 in a position to cause a swinging movement of the link 320 about its pivot to move the lower end of the link 314 towards or from the pivot of the cam lever 312. To lock the supporting link 320 in adjusted position a locking rod 322 is pivotally connected to the lower end of the link and extends diametrically through the flanged end of a hollow sleeve 324, see Figs. 25 and 26, journaled in the hub of the cam lever 312.

Cooperating with the locking rod 322 is a toothed block 326 yieldingly mounted in the outer end of a tubular plunger 328 mounted to slide within the sleeve 324. The block 326 is provided with teeth arranged to engage similar teeth formed on the rod 322 and hold the rod from longitudinal movement so long as the block is pressed against the rod.

In common with applicant's prior machines, the movement of the jack of the illustrated machine to operative position by the operator adjusts the jack feeding mechanism in accordance with the size of the shoe supported upon the jack, and in order to permit this adjustment, means are provided for holding the block 326 out of engagement with the locking rod 322 of the feeding mechanism while the jack is being moved to operative position and for thereafter moving the block into engagement with the rod. The block 326 is moved and held out of engagement with the rod 322 by a spring 330 located within the tubular plunger 328 and interposed between a plug 332 screwed into the inner end of the plunger and a pin 334 mounted in the hollow sleeve 324 and extending diametrically across the tubular plunger through longitudinal slots in the plunger, the pin 334 serving both as a support for one end of the spring 330 and as a connection to prevent relative rotary movement of the plunger and sleeve. The block 326 is connected to move with the tubular plunger 328 by means of a cross pin 336 mounted in the tubular plunger and extending through longitudinal slots in a rearward tubular extension of the block. A spring 338 seated in this tubular extension and supported by the pin 336 permits the block to yield with relation to the plunger when the plunger is moved to bring the block into engagement with the locking rod 322. During the movement of the jack to operative position the locking rod slides freely through the flanged end of sleeve 324. To move the tubular plunger 328 against the force of spring 330 to lock the jack feeding mechanism in adjusted position, connections actuated from the starting treadle are provided, see Figs. 7 and 10, comprising an arm 340 arranged to bear against an adjustable screw 342 projecting from the end plug 332 of the tubular plunger, a bell crank 344 the horizontal arm of which carries a roll 346 arranged to engage the arm 340 and a pin 348 projecting beneath the bell crank 344 from a vertical rod 330 connected to the rear end of the treadle lever 116. Due to the relative arrangement of the arm 340 and bell crank 344 the bell crank, when raised from the position indicated in Fig. 10 to that indicated in Fig. 7, by a depression of the starting treadle, remains in the latter position holding the connections of the jack feeding mechanism locked in adjusted condition after the starting treadle is released. To unlock the connections of the jack feeding mechanism so as to permit an adjustment by the subsequent movement of the jack to operative position, the illustrated machine utilizes connections from one of the pattern cams which are actuated as the pattern cam completes its rotation and the machine comes to rest. These connections comprise a link 352 connected at its rear end to an arm projecting from the hub of the pattern cam lever 354 which lever, as hereinafter described, is also utilized to relieve the upward pressure of the jack and push the jack outwardly. The link 352 rests upon a roll 356 carried by the vertical arm of the bell crank 344 and is provided with a shoulder to engage the roll and move the bell crank to release the arm 340, as indicated in Fig. 7, when the lever 354 is actuated by its pattern cam as the cam completes its rotation. In starting the machine the link 352 is raised to move the shoulder above the roll 356 by a pin 358 projecting from the treadle connected rod 350 beneath the forward end of the link.

The feed cam lever 312 is held in engagement with the pattern cam 24 by means of a spring 359, see Figs. 2, 10 and 25, coiled about the bearing for the lever and having one end engaging a lug 361 on the machine base and the other engaging a pin 363 carried by a collar 365 clamped on the inner end of the hub of the lever. The shape of the cam 24 is such that during the intermittent movements of the cam the jack is fed step by step to transfer the point of operation of the lasting units along the shoe and, as the cam completes its rotation at the conclusion of the lasting operation, a continuous return or back feeding movement is imparted to the jack.

Longitudinal tipping movements about a transverse axis passing through the points of contact of the presser-feet 6 of the lasting units with the insole of the shoe are imparted to the jack by the direct engagement of the pattern cam 22 with an arm projecting downwardly from the base 306 of the jack supporting structure. The downwardly projecting arm of the base 306 is maintained in contact with the cam 22 by a spring 367 connected at its upper end to a lug on the machine frame, and at its lower end to an arm 369 extending horizontally from the inner end of the hollow pivot of the base 306 (see Figs. 2, 6, 9 and 10).

The mechanism for adjusting the lateral position of the lasting units by the movement of the jack to starting position is best shown in Figs. 4, 5, and 6, and comprises a cam plate 360 secured to the bell crank 316 of the jack feeding mechanism. The cam plate 360 engages a roll on one end of a horizontal lever 362, the other end of which is arranged to project beneath a roll 364 mounted upon the forward end of a horizontal link 366 pivotally supported at its rear end upon the vertical arm of a bell crank 368. At the time the jack is moved to operative position the roll 364 is over the lever 362 as indicated in Fig. 5, and consequently the link 366 is raised by the actuation of the lever 362 by the cam plate 360, the amount of movement imparted to the link 366 depending on the position of the cam 360 at the start of the operation, which position varies with the size of the shoe. The link 366 extends beneath a pin 370 projecting from the vertical rod 220 which is connected to the lasting units as hereinbefore described, and as the link is raised, it lifts the rod 220 and positively moves the lasting units towards each other. To enable the position to which the lasting units are adjusted for any given size of shoe to be varied, the roll 364 is mounted on the link 366 so as to be capable of a vertical adjustment, being journaled in a block 372 pivotally connected to the link and provided with a vertical arm carrying an adjusting screw 374 bearing against a vertical lug 376 of the link. While the machine is in operation the mechanism for adjusting the lateral position of the lasting units is inoperative, the parts being held in the position indicated in Fig. 6 by the action of a toggle spring 378 on the bell crank 368, in which position the roll 364 is out of the path of lever 362 and consequently the lasting units are free to move under the influence of the spring 224. The mechanism for adjusting the lasting units is rendered inoperative, as indicated in Fig. 6, by connections from the starting treadle comprising a bell crank 380, the horizontal arm of which is connected to the treadle rod 350 and the vertical arm of which is provided with a cam surface to engage a roll 382 mounted on the horizontal arm of the bell crank 368. Upon a depression of the treadle after the jack is in operative position, to start the machine the bell crank 380 is swung in a counterclockwise direction to engage the roll 382 and swing the bell crank 368 from the position indicated in Fig. 5 to that indicated in Fig. 6.

The bell crank 368 is swung in a direction to render the mechanism for adjusting the lasting units operative by connections actuated from a pattern cam on stopping the machine. These connections include a block 384 pivotally mounted on the horizontal arm of the bell crank 368 provided with a depending arm having a hook at its lower end extending beneath a pin 386 projecting from an arm extending horizontally from the hub of the upper member 388 of a toggle lever forming a part of the pattern cam actuated connections hereinafter described for moving the jack outwardly. A movement of the toggle member 388 in a clockwise direction as viewed in Fig. 6 brings the pin 386 into engagement with the hook of block 384 and pulls downwardly on the block to actuate the bell crank 368. The movement of the bell crank 368 from the position of Fig. 6 to that of Fig. 5 swings the toggle spring 378 across the pivotal axis of the bell crank so that the spring acts to retain the bell crank in the position to which it has been moved. The lower end of the spring 378 is connected to a lever arm 390, the free end of which extends beneath a roll 392 on the toggle member 388 arranged to depress the lever arm 390 when the toggle is straightened and thereby stretch the spring 378.

This movement of the bell crank 368 in a counter-clockwise direction carries the roll 364 on the link 366 over the lever 362, which at this time is held from movement by engagement with the cam plate 360, and causes the link to be raised into engagement with the pin 370 on the rod 220, so that, not only is the adjusting mechanism for the units rendered operative, but the lasting units are moved towards each other to remove the presser-feet of the units from contact with the rib of the insole prior to the downward and outward movement of the jack.

To move the hook of the block 384 out of engagement with the pin 386 when the bell crank 368 is actuated from the starting treadle through the rod 350 and bell crank 280, the roll 382, which is engaged by the bell crank 380, is mounted upon the block 384 in a position to cause the block to be swung on its pivotal connection with bell crank 368 before the bell crank is actuated. The swinging movement of the block 384 is limited by a pin 394 on the toggle member 388 arranged to engage the hooked arm of the block 384 on the opposite side from the pin 386. A spring 396 mounted on the bell crank 368 tends to hold the hooked arm of the block 384 in contact with the pin 386.

While the machine is in operation an upward pressure is exerted on the jack to force the shoe against the presser-feet of the lasting units from a spring indicated at 398, see particularly Fig. 14. At its upper end this spring is connected to an adjustable support hereinafter described and at its lower end is connected to a lever arm 400, see also Fig. 9, the action of the spring being to pull the arm upwardly. From the free end of the arm 400 a cord 402 leads downwardly to a guiding pulley 404 on the machine base, then horizontally through the hollow pivot of the base 306 of the jack supporting structure, around a pulley 406 mounted at the pivotal connection of the arm 308 with the base 306, upwardly to a pulley 408 at the pivotal connection of the link 310 with the arm 308 and then downwardly to the lower end of a link 410, the upper end of which is pivotally connected to the lower end of the jack frame 304 at one side of its pivotal connection with the supporting link 310. The lower end of the link 410 is pivotally connected to a link 412 the other end of which is pivoted on the arm 308 of the jack supporting structure, the arrangement being such that the pull on the cord produced by the spring 398 exerts an upward thrust on the link 410 to move the jack upwardly with its supporting link 310 and force the shoe against the presser-feet of the lasting units. As a convenient means of adjustment, the cord 402 is connected to the link 410 by a screw threaded rod 414 and adjusting wing nut 416.

The adjustable support to which the upper end of the spring 398 is secured is indicated at 418 and consists of an arm pivotally mounted on a shaft 420. During each cycle of operations of the upper tensioning and securing devices, the support 418 is actuated to increase and diminish the force exerted by the spring, the tension of the spring being increased during the action of the staple driving devices and being diminished during that part of the cycle of operations in which the shoe is fed. The support 418 is actuated with certainty at the desired times from the rapidly rotating operating cam shaft 10 through connections comprising a link 422 connecting a point on the oscillating and longitudinally moving lever 26 hereinbefore described with a pawl carrying frame 424 pivotally mounted on the shaft 420. A pawl 426 is mounted on the frame 424 and is held by a spring 428 in engagement with a lug projecting from the hub of the arm 418 on the opposite side of the pivot from the point of attachment of the spring 398. During each downward movement of the lever 26 the arm 418 is swung in a direction to increase the tension of spring 398 as indicated in Fig. 14. In order to relieve the tension of the spring 398 quickly and before the start of a shoe feeding movement, a pawl releasing arm 430 is adjustably mounted on the machine frame, and is provided with a pin projecting into a position to engage the pawl and lift it out of engagement with the arm 418 as the lever 26 reaches the limit of its downward movement.

In the illustrated machine the depression of the jack to remove the shoe from contact with the lasting units prior to the outward movement of the jack is accomplished through connections actuated from a pattern cam and operating to relieve the jack from the upward pressure exerted by the spring 398. The pattern cam utilized is the one hereinbefore referred to as actuating the lever 354 and is indicated at 432, see particularly Fig. 14. The lever 354, the movements of which are controlled by the pattern cam 432 is connected by a link 434 to a pivotally mounted arm 436 provided with a set screw 438 bearing against the upper side of a lug projecting from the lever arm 400 to which the spring 398 and cord 402 are secured. With this construction, during the normal operation of the machine, the cam follower on the cam lever 354 is out of contact with the cam 432 and the arm 400 is free to move under the influence of the spring 398. As the pattern cam completes its revolution, however, the lever 354 is actuated to depress the arm 436 and with it the arm 400, thereby relieving the cord 402 from the tension of spring 398 and permitting the jack to move downwardly.

In the illustrated machine the outward movement of the jack at the conclusion of the lasting operation is also accomplished through connections actuated from a pattern cam and conveniently a part of the connections just described for relieving the upward pressure of the jack are utilized for this purpose. As has been stated, the member 388 forms part of a toggle lever by which the outward movement is imparted to the jack. The other member of this toggle lever, indicated at 440, is pivotally connected to the lever arm 436 which is actuated from the pattern cam 432 through the lever 354 and link 434 as has been described. During the normal operation of the machine the toggle formed by the members 388 and 440 is in a broken condition, as shown in Figs. 6 and 14. As the machine comes to rest, the toggle is moved to a straightened position, as indicated in Figs. 3 and 5 by the downward movement of the arm 436 under the influence of the pattern cam 432. A horizontal plunger 442, mounted in the machine frame is connected by a link 444 to the upper member 388 of the toggle and, as the toggle is straightened, this plunger engages a plate 446, secured to the jack frame 304. An outward movement is thus imparted to the jack supporting structure about the pivotal connection of the arm 308 with the base portion 306 sufficient to cause a continued movement under the force of gravity to the final outward position indicated in Fig. 3. The outward movement of the jack is checked by a spring 448 connected by a cord 450 to the arm 308 of the jack supporting structure.

The toggle remains in a straightened condition until the jack is again moved inwardly and while in this condition holds the arms 436 and 400 depressed, thereby constituting a locking means to hold the spring 398, which normally forces the jack upwardly, out of operation. A spring 452, connecting a lug on the lower member 440 of the toggle with the arm 436 tends to hold the two members of the toggle in alignment. The toggle is broken and permitted to return to normal position under the action of the spring 398 by contact with the plunger 442 of the plate 446 when the jack is moved inwardly by the operator for operation on the next shoe.

The mechanisms mounted in the jack 304 are best shown in Figs. 27, 28 and 29. These mechanisms comprise means for shifting the lateral position of the shoe with relation to a pivotal axis extending close to the shoe bottom lengthwise of the shoe, means for automatically clamping the shoe on the jack prior to the start of the operation on the shoe, and means for unclamping the shoe and resetting the automatic shoe clamping mechanism as the machine stops. The shoe supporting means are the same as in the machine of Patent No. 1,999,298 and comprise a cradle 454 pivotally mounted in the jack frame 304 to swing about an axis extending close to the bottom of a supported shoe lengthwise of the shoe, a heel supporting last pin 456 projecting from a slide 458 mounted in the cradle 454, and toe supporting grips 460 and toe gage 462 also mounted on the cradle. To shift the lateral position of the shoe, means are provided, as in the machine of Patent No. 1,999,298, for imparting a sidewise movement to the cradle 454 with relation to its supporting pivots, comprising a rock shaft 464 mounted in the jack frame 304 and provided with upwardly extending arms 466 connected to opposite ends of the cradle 454 by links 468. An arm 470 projecting downwardly from the rock shaft is engaged by the groove of an actuating cam 472 secured to a shaft 474 journaled in the jack frame 304 to rotate about an axis parallel to the pivotal axis of the frame.

To clamp the shoe in position on the cradle 454, means are provided for releasing the slide 458 when a shoe is placed on the jack and for moving the slide with the last pin 456 towards the toe grips 460 and end gage 462. These means are the same as in the machine of Patent No. 1,999,298, and comprise a spring 476 acting on the slide 458, a pawl 478 engaging a downwardly projecting lug 480 on the slide, a spring supported plunger 482 mounted in the last pin 456 and an L-shaped lever 484 located between the lower end of the plunger and the end of the pawl, when the parts are in the position illustrated in Fig. 28, and adapted to be depressed by the plunger when a shoe is placed on the jack, to disengage the pawl 478 from the lug 480 of the slide 458.

The L-shaped lever 484 is acted upon by a spring 486 and is connected by a link 488 to a lever 490 for locking the cradle 454 against rocking movement after the completion of the lasting operation and until a new shoe is placed on the jack. With the parts in the position illustrated in Fig. 28 the L-shaped lever 484, and the cradle locking lever 490 are held in position by the toggle formed by the L-shaped lever and the link 488. A depression of the plunger 482 moves the L-shaped lever clockwise, thereby breaking the toggle and permitting a spring 492 located between a pivotally mounted arm 494 and the pivotal connection of the link 488 with the lever 490 to swing the locking lever to the left out of engagement with the cradle, the construction and operation being the same as in the machine of the patent. Also, as in the machine of the patent, a toggle spring 496 is arranged to act on the arm 494 and a link 498 is connected to the arm 494 by which the arm is swung from the position indicated in Fig. 27, to that indicated in Fig. 28, in which latter position the spring 492 is tensioned sufficiently to swing the locking lever 490 away from the cradle when the toggle formed by the link 488 and L-shaped lever 484 is broken by a depression of the plunger 482. The operation of the parts is the same as in the machine of the patent, the only difference in the construction being that the link 498 and the toggle spring 496 are connected directly to the pivoted arm 494.

The new and improved means for actuating and controlling the mechanisms mounted in the jack frame above described comprise novel connections actuated from a pattern cam for rotating the shaft 474 and connections actuated from the shaft 474 for resetting the automatic shoe clamping mechanism and for unclamping the shoe. Referring first to the connections actuated from the shaft 474, these comprise a pulley 500 provided with a crank pin 502 connected by a link 504 to a lever 506 mounted upon supporting links 508 and 510. To the upper end of the lever 506 is pivotally connected one end of the pawl 478 of the automatic shoe clamping mechanism, the other free end of the pawl being yieldingly supported by a spring pressed bell crank 512. To the upper end of the lever 506 is also connected by means of a pin and slot the link 498 which controls the position of the toggle spring 496. During the lasting operation the pulley 500 is rotated in a clockwise direction, as viewed in Figs. 27 and 28, and through the connections described moves the pawl 478 to the right, the pawl being depressed as its end passes beneath the lug 480 of the slide 458 and finally reaching the position indicated substantially in Fig. 27. Also by reason of the pin and slot connection between the lever 506 and the link 498, the arm 494 is swung to move the toggle spring 496 from one side of the pivot of the arm to the other and the parts assume the position indicated in Fig. 27 with the cradle locking lever 490 in contact with the cradle 454. At the conclusion of the lasting operation the pulley 500 is rotated in a counterclockwise direction from the position indicated in Fig. 27 to that indicated in Fig. 28, and during this rotation through the connections described, the slide 458 carrying the heel support 456 is forced away from the toe supports against the tension of spring 476, thereby unclamping the shoe and resetting the automatic shoe clamping mechanism for operation with the next shoe. Simultaneously with these operations the toggle spring 496 is returned to the position indicated in Fig. 28.

The pulley 500 is secured to the shaft 474 and thus rotates the cam 472 to shift the lateral position of the shoe through the connections hereinbefore described. The shaft makes a partial rotation only in each direction and, in order to permit different portions of the cam groove to be used for shoes of different styles, an adjustable connection is provided between the pulley 500 and the cam 472. This connection consists of an arm 514 secured to the shaft and provided with a spring pressed locking plunger 516 arranged to engage either of two holes located at diametrically opposite points in a disk 518 secured to the hub of the pulley 500.

The connections for rotating the pulley 500 are best shown in Fig. 12, and comprise a cord 520 the two ends of which are secured to a drum 522 mounted in the base of the machine. The cord passes from the drum to a guiding pulley 524 in the machine base, then axially through the hollow pivot of the base 306 of the jack supporting structure, around a pulley 526 at the pivotal connection of the arm 308 with the base 306, upwardly, horizontally and again upwardly, around pulleys 528 and 530 at the pivotal connections of the supporting link 310 with the arm 308 and jack frame 304 and around the pulley 500, and then returns over corresponding pulleys to the drum 522. Rotation of the drum 522 in opposite directions exerts a pull on the cord 520 and imparts a corresponding rotation to the pulley 500 in the jack frame. The drum 522 is rotated in one direction by a spring 532 connected to the drum and in the other direction by a pattern cam lever 534, one end of which engages a pin 536 on the drum and the other end of which engages a pattern 538 on the pattern cam shaft 12.

The nature and scope of the present invention having been indicated, and a machine embodying the several features of the invention having been specifically described, what is claimed is:

1. A side lasting machine having, in combination, a shoe supporting jack, two sets of lasting devices arranged to act on an upper at opposite sides of a shoe supported upon the jack, means for actuating said devices to last progressively both sides of the shoe upper as the point of operation is transferred along the shoe, a pattern cam and connections for moving the jack to transfer the point of operation along the shoe, and means for imparting an intermittent movement to the cam in timed relation to the lasting devices to space the points of operation along the shoe.

2. A machine for use in the manufacture of shoes having, in combination, devices for performing an operation progressively along the bottom margin of a shoe, an operating cam shaft and connections for actuating said devices, a shoe supporting jack, a pattern cam and connections for moving the jack to transfer the point of operation of said devices along the shoe, and at the conclusion of said transfer to impart a return movement to the jack, a driving clutch, mechanism driven by the clutch for rotating the operating cam shaft and the pattern cam, and mechanism driven by the clutch in timed relation with the operating cam shaft and pattern cam for opening the clutch after the return movement of the jack.

3. A machine for use in the manufacture of shoes having, in combination, devices for performing an operation progressively along the bottom margin of a shoe, an operating cam shaft and connections for actuating said devices, a shoe supporting jack, a pattern cam and connections for moving the jack to transfer the point of operation of said devices along the shoe and at the conclusion of said transfer to impart a return movement to the jack, a driving clutch, mechanism driven by the clutch for rotating the operating cam shaft continuously and the pattern cam intermittently, and mechanism driven by the clutch in timed relation with the operating cam shaft and pattern cam for opening the clutch after the return movement of the jack.

4. A machine for use in the manufacture of shoes having, in combination, devices for performing an operation progressively along the bottom margin of a shoe, an operating cam shaft and connections for actuating said devices, a shoe supporting jack, a pattern cam and connections for moving the jack to transfer the point of operation of said devices along the shoe, and at the conclusion of said transfer to impart a return movement to the jack, a driving clutch, mechanism driven by the clutch for rotating the operating cam shaft continuously, mechanism driven by the operating shaft for rotating the pattern cam intermittently, and mechanism driven by the clutch in timed relation with the operating cam shaft and pattern cam for opening the clutch after the return movement of the jack.

5. A machine for use in the manufacture of shoes having, in combination, devices for performing an operation progressively along the bottom margin of a shoe, an operating cam shaft and connections for actuating said devices, a shoe supporting jack, pattern cams and connections for controlling the relative positions of said devices and jack during the operation on the shoe, a driving clutch, mechanism driven by the clutch for rotating the operating cam shaft and pattern cams, and means for opening the clutch comprising mechanism moving with the pattern cams into operative position and actuated by the operating cam shaft to open the clutch.

6. A machine for use in the manufacture of shoes having, in combination, devices for performing an operation progressively along the bottom margin of a shoe, an operating cam shaft and connections for actuating said devices, a shoe supporting jack, pattern cams and connections for controlling the relative positions of said devices and jack during the operation on the shoe, a driving clutch, mechanism driven by the clutch for rotating the operating cam shaft continuously, mechanism driven by the operating cam shaft for rotating the pattern cam intermittently, and means for opening the clutch comprising mechanism moving with the pattern cams into operative position and actuated by the operating cam shaft to open the clutch.

7. A machine for use in the manufacture of shoes having, in combination, devices for performing an operation progressively along the bottom margin of a shoe, an operating cam shaft and connections for actuating said devices, a shoe supporting jack, pattern cams and connections for controlling the relative positions of said devices and jack during the operation on the shoe, a driving clutch, mechanism driven by the clutch for rotating the operating cam shaft continuously, mechanism driven by the operating cam shaft for rotating the pattern cams intermittently comprising a disk, a shaft carrying the disk and connected to the pattern cams, a vibrating disk actuator driven by the operating cam shaft, a series of engageable devices spaced around the periphery of the disk, a device on the actuator to engage and disengage said devices successively, and means for opening the clutch comprising mechanism mounted on the disk carrying shaft and movable thereby into operative position, and connections from said actuator for actuating said mechanism to open the clutch.

8. A machine for use in the manufacture of shoes having, in combination, devices for performing an operation progressively along the bottom margin of a shoe, an operating cam shaft and connections for actuating said devices, a shoe supporting jack, pattern cams and connections for controlling the relative positions of said devices and jack during the operation on the shoe, a driving clutch, mechanism driven by the clutch for rotating the operating cam shaft continuously, mechanism driven by the operating cam shaft for rotating the pattern cams intermittently comprising a disk provided with slots spaced around the periphery of the disk, a shaft carrying the disk and connected to the pattern cams, a vibrating disk actuator driven by the operating cam shaft provided with a pin to engage and disengage the slots successively, and means for opening the clutch comprising mechanism mounted on the disk carrying shaft and movable thereby into operative position, and connections from said actuator for actuating said mechanism to open the clutch.

9. A machine for use in the manufacture of shoes having, in combination, devices for performing an operation progressively along the bottom margin of a shoe, an operating cam shaft and connections for actuating said devices, a shoe supporting jack, pattern cams and connections for controlling the relative positions of said devices and jack during the operation on the shoe, a driving clutch, mechanism driven by the clutch for rotating the operating cam shaft continuously, and mechanism driven by the operating cam shaft for rotating the pattern cams intermittently comprising a disk, a shaft carrying the disk and connected to the pattern cams, a vibrating disk actuator driven by the operating cam shaft, a series of engageable devices spaced around the periphery of the disk, and a device on the actuator to engage and disengage said devices successively.

10. A machine for use in the manufacture of shoes having, in combination, devices for performing an operation progressively along the bottom margin of a shoe, an operating cam shaft and connections for actuating said devices, a shoe supporting jack, pattern cams and connections for controlling the relative positions of said devices and jack during the operation on the shoe, a driving clutch, mechanism driven by the clutch for rotating the operating cam shaft continuously, and mechanism driven by the operating cam shaft for rotating the pattern cams intermittently comprising a disk provided with slots spaced around the periphery of the disk, a shaft carrying the disk and connected to the pattern cams, and a vibrating disk actuator driven by the operating cam shaft provided with a pin to engage and disengage the slots successively.

11. A machine for use in the manufacture of shoes having, in combination, devices for performing an operation progressively along the bottom margin of a shoe, an operating cam shaft and connections for actuating said devices, a shoe supporting jack, a pattern cam and connections for moving the jack to transfer the point of operation of said devices along the shoe, a pattern cam shaft, a bearing for said pattern cam shaft beyond which the end of the shaft projects, and means for securing the pattern cam on the projecting end of the pattern cam shaft while permitting its removal axially of the shaft, and means for driving said shafts in time relation to each other.

12. A machine for use in the manufacture of shoes having, in combination, devices for performing an operation progressively along the bottom margin of a shoe, an operating cam shaft and connections for actuating said devices, a shoe supporting jack, pattern cams and connections for controlling the relative positions of said devices and jack during the operation on the shoe, a plurality of pattern cam shafts on which the pattern cams are mounted, bearings supporting the pattern cam shafts arranged to permit certain of the cams to be removed axially of the shafts, and means for driving the operating cam shaft and the pattern cam shafts in time relation to each other.

13. A machine for use in the manufacture of shoes having, in combination, devices for performing an operation progressively along the bottom margin of a shoe, an operating cam shaft and connections for actuating said devices, a shoe supporting jack, pattern cams and connections for controlling the relative positions of said devices and jack during the operation on the shoe, a pattern cam shaft, a bearing for said pattern cam shaft beyond which the end of the shaft projects, a second pattern cam shaft at right angles to the first mentioned pattern cam shaft, a bearing for said second pattern cam shaft beyond which the end of said second pattern cam shaft projects, means for securing pattern cams on the projecting ends of said pattern cam shafts while permitting their removal axially of the shaft, and means for driving said shafts in time relation to each other.

14. A machine for use in the manufacture of shoes having, in combination, devices for performing an operation progressively along the bottom margin of a shoe, an operating cam shaft and connections for actuating said devices, a shoe supporting jack, pattern cams and connections for controlling the relative positions of said devices and jack during the operation on the shoe, including a pair of cams and connections actuated thereby during the operation on a right shoe, and means for shifting said connections to cause each cam to actuate, during the operation on a left shoe, the connections actuated by the other cam during the operation on a right shoe.

15. A side lasting machine having, in combination, a shoe supporting jack, two sets of lasting devices arranged to act on an upper at opposite sides of a shoe supported upon the jack, means for actuating said devices to last progressively both sides of the shoe upper as the point of operation is transferred along the shoe, supports on which the lasting devices are mounted, a pair of pattern cams and connections actuated thereby, during the operation on a right shoe, to swing said supports about axes substantially perpendicular to the shoe bottom, and means for shifting said connections to cause each cam, during the operation on a left shoe, to actuate the connections actuated by the other cam during the operation on a right shoe.

16. A machine for use in the manufacture of shoes having, in combination, devices for performing an operation progressively along the bottom margin of a shoe, an operating cam shaft and connections for actuating said devices, a shoe supporting jack, means for actuating the jack to feed the shoe step by step past said devices, means for exerting an upward pressure on the jack to force the shoe towards said devices, and connections actuated by the operating cam shaft for relieving the upward pressure of the jack during each feeding movement of the jack.

17. A machine for use in the manufacture of shoes having, in combination, devices for performing an operation progressively along the bottom margin of a shoe, an operating cam shaft and connections for actuating said devices, a shoe supporting jack, means including a spring exerting an upward pressure on the jack to force the shoe towards said devices, and means acting at the completion of the operation on the shoe to relieve the pressure of the spring.

18. A machine for use in the manufacture of shoes having, in combination, devices for performing an operation progressively along the bottom margin of a shoe, an operating cam shaft and connections for actuating said devices, a shoe supporting jack, means including a spring exerting an upward pressure on the jack to force the shoe towards said devices, means acting at the completion of the operation on the shoe to render said spring inoperative, and locking mechanism to hold said spring out of operation.

19. A machine for use in the manufacture of shoes having, in combination, devices for performing an operation progressively along the bottom margin of a shoe, an operating cam shaft and connections for actuating said devices, a shoe supporting jack, means including a spring exerting an upward pressure on the jack to force the shoe towards said devices, and means acting at the completion of the operation on the shoe to relieve the pressure of the spring and move the jack outwardly.

20. A machine for use in the manufacture of shoes having, in combination, devices for performing an operation progressively along the bottom margin of a shoe, an operating cam shaft and connections for actuating said devices, a shoe supporting jack, means including a spring exerting an upward pressure on the jack to force the shoe towards said devices, means acting at the completion of the operation on the shoe to render said spring inoperative and to move the jack outwardly, and locking mechanism actuated during the outward movement of the jack to hold said spring out of operation and actuated during the inward movement of the jack to release the spring.

21. A machine for use in the manufacture of shoes having, in combination, devices for performing an operation progressively along the bottom margin of a shoe, an operating cam shaft and connections for actuating said devices, a shoe supporting jack, means for actuating the jack to feed the shoe step by step past said devices, means including a spring exerting an upward pressure on the jack to force the shoe towards said devices, means for relieving the pressure of the spring during each feeding movement of the jack to facilitate said movements, and means acting at the completion of the operation on the shoe to relieve the pressure of the spring to permit a downward movement of the shoe.

22. A machine for use in the manufacture of shoes having, in combination, devices for performing an operation progressively along the bottom margin of a shoe, an operating cam shaft and connections for actuating said devices, a shoe supporting jack, a pattern cam shaft, means for driving said shafts in timed relation to each other, means for exerting an upward pressure on the jack to force the shoe towards said devices, and means including a cam rotating with the pattern cam shaft, acting at the completion of the operation on the shoe to depress the jack.

23. A machine for use in the manufacture of shoes having, in combination, devices for performing an operation progressively along the bottom margin of a shoe, an operating cam shaft and connections for actuating said devices, a shoe supporting jack, a pattern cam shaft, means for driving said shafts in timed relation to each other, and means including a cam rotating with the pattern cam shaft acting at the completion of the operation on the shoe to move the jack outwardly.

24. A machine for use in the manufacture of shoes having, in combination, devices for performing an operation progressively along the bottom margin of a shoe, an operating cam shaft and connections for actuating said devices, a shoe supporting jack, a pattern cam shaft, means for driving said shafts in timed relation to each other, means for exerting an upward pressure on the jack to force the shoe towards said devices, and means including a cam rotating with the pattern cam shaft acting at the completion of the operation on the shoe to depress the jack and move the jack outwardly.

25. A side lasting machine having, in combination, a shoe supporting jack, two sets of lasting devices arranged to act on an upper at opposite sides of a shoe supported upon the jack, means for actuating said devices to last progressively both sides of the shoe upper as the point of operation is transferred along the shoe, supports upon which said devices are mounted movable towards and from each other to position said devices varying distances apart as the shoe bottom varies in width, and means to position said supports initially in varying positions before the start of the lasting operation comprising normally inoperable adjusting mechanism, a pattern cam and connections actuated by the cam on stopping the machine to render said mechanism operable.

26. A side lasting machine having, in combination, a shoe supporting jack, two sets of lasting devices arranged to act on an upper at opposite sides of a shoe supported upon the jack, means for actuating said devices to last progressively both sides of the shoe upper as the point of operation is transferred along the shoe, supports upon which said devices are mounted movable towards and from each other to position said devices varying distances apart as the shoe bottom varies in width, means to position said supports initially in varying positions before the start of the lasting operation comprising normally inoperable adjusting mechanism, a pattern cam and connections actuated by the cam on stopping the machine to render said mechanism operable, and means comprising said pattern cam, acting on stopping the machine to move the jack outwardly.

27. A side lasting machine having, in combination, a shoe supporting jack, two sets of lasting devices arranged to act on an upper at opposite sides of a shoe supported upon the jack, means for actuating said devices to last progressively both sides of the shoe upper as the point of operation is transferred along the shoe, supports upon which said devices are mounted movable towards and from each other, yielding means tending to separate said supports to position said devices varying distances apart as the shoe bottom varies in width, means operating on stopping the machine to move said supports towards each other, and means of adjusting said supports to varying positions prior to the start of a subsequent lasting operation.

28. A side lasting machine having, in combination, a shoe supporting jack, two sets of lasting devices arranged to act on an upper at opposite sides of a shoe supported upon the jack, means for actuating said devices to last progressively both sides of the shoe upper as the point of operation is transferred along the shoe, supports upon which said devices are mounted movable towards and from each other, yielding means tending to separate said supports to position said devices varying distances apart as the shoe bottom varies in width, means comprising a pattern cam and connections actuated by the cam on stopping the machine to move said supports towards each other, and means for adjusting said supports to varying positions prior to the start of a subsequent lasting operation.

29. A side lasting machine having, in combination, a shoe supporting jack, two sets of lasting devices arranged to act on an upper at opposite sides of a shoe supported upon the jack, means for actuating said devices to last progressively both sides of the shoe upper as the point of operation is transferred along the shoe, supports upon which said devices are mounted movable towards and from each other, yielding means tending to separate said supports to position said devices varying distances apart as the shoe bottom varies in width, and means comprising a pattern cam and connections actuated by the cam on stopping the machine to move said supports towards each other.

30. A side lasting machine having, in combination, a shoe supporting jack, two sets of lasting devices arranged to act on an upper at opposite sides of a shoe supported upon the jack, means for actuating said devices to last progressively both sides of the shoe upper as the point of operation is transferred along the shoe, supports upon which said devices are mounted movable towards and from each other, yielding means tending to separate said supports to position said devices varying distances apart as the shoe bottom varies in width, means to position said supports initially in varying positions before the start of the lasting operation comprising normally inoperable adjusting mechanism, and a pattern cam and connections actuated by the cam on stopping the machine to move said supports towards each other and simultaneously to render said mechanism operable.

31. A lasting machine having, in combination, lasting devices including an upper stretching gripper arranged to have an up-draw movement away from the sole of a shoe presented to said devices, mechanism for actuating the gripper comprising a cam, connections between the cam and the gripper including a lever, means for yieldingly supporting the fulcrum of the lever against movement in one direction during the up-draw movement of the gripper, and means including a pattern cam and connections for supporting the fulcrum against movement in the opposite direction during the return movement of the gripper.

32. A lasting machine having, in combination, lasting devices including an upper stretching gripper arranged to have an up-draw movement away from the sole of a shoe presented to said devices, mechanism for actuating the gripper comprising a cam, connections between the cam and the gripper including a lever, means for yieldingly supporting the fulcrum of the lever against movement in one direction during the up-draw movement of the gripper, and mechanism acting to stop the movement of the fulcrum in the opposite direction in varying positions to vary the return movement of the gripper.

33. A lasting machine having, in combination, lasting devices including an upper stretching gripper arranged to have an up-draw movement away from the sole of a shoe presented to said devices, mechanism for actuating the gripper comprising a cam, connections between the cam and the gripper including a lever, means for yieldingly supporting the fulcrum of the lever against movement in one direction during the up-draw movement of the gripper, and means acting on the fulcrum to permit a varying movement of the fulcrum in the opposite direction to vary the return movement of the gripper.

34. A lasting machine having, in combination, lasting devices including a pair of upper stretching gripper jaws arranged to have an up-draw movement away from the sole of a shoe presented to said devices, a gripper actuating member having a movement relative to the jaws away from the sole to close the jaws, and a movement with the jaws to impart up-draw and return movements to the jaws, a latch to connect the jaws and member and prevent relative movement, and means for rendering the latch inoperative during the jaw closing movement of the member.

35. A lasting machine having, in combination, upper stretching and securing devices including a pair of upper stretching gripper jaws arranged to have an up-draw movement away from the sole of a shoe presented to said devices, cyclically operating mechanisms for actuating said devices to last progressively the shoe upper as the point of operation is transferred along the shoe, said mechanisms including a gripper actuating member having a movement relative to the jaws away from the sole to close the jaws, and a movement with the jaws to impart up-draw and return movements to the jaws, a normally inoperative latch to connect the jaws and member and prevent relative movement, and means for causing the latch to connect the jaws and member to render the jaws inoperative to tension the upper during a cycle of operations of the upper securing devices.

36. A lasting machine having, in combination, upper stretching and securing devices including a pair of upper stretching gripper jaws arranged to have an up-draw movement away from the sole of a shoe presented to said devices, cyclically operating mechanisms for actuating said devices to last progressively the shoe upper as the point of operation is transferred along the shoe, said mechanisms including a gripper actuating member having a movement relative to the jaws away from the sole to close the jaws, and a movement with the jaws to impart up-draw and return movements to the jaws, and means operating during a cycle of operations of the upper securing devices to connect the jaws and member to prevent relative movement during a movement of the jaws away from the shoe sole.

37. A lasting machine having, in combination, upper stretching and securing devices including a pair of upper stretching gripper jaws arranged to have an up-draw movement away from the sole of a shoe presented to said devices, cyclically operating mechanisms for actuating said devices to last progressively the shoe upper as the point of operation is transferred along the shoe, said mechanisms including a gripper actuating member having a movement away from the sole relative to the jaws and then with the jaws, and means operating during a cycle of operations of the upper securing devices to connect the actuating member and jaws to increase the movement of the jaws away from the sole.

38. A lasting machine having, in combination, upper stretching and securing devices including a pair of upper stretching gripper jaws arranged to have an up-draw movement away from the sole of a shoe presented to said devices, cyclically operating mechanisms for actuating said devices to last progressively the shoe upper as the point of operation is transferred along the shoe, said mechanisms including a gripper actuating member having a movement away from the sole relative to the jaws and then with the jaws, and means operating during a cycle of operations of the upper securing devices to connect the actuating member and jaws to increase the movement of the jaws away from the sole, and means operating during another cycle of operations of the upper securing devices to retain the jaws and actuating member in connected relation.

39. A machine for use in the manufacture of shoes having, in combination, means for performing an operation progressively along the bottom margin of a shoe, an operating cam shaft and connections for actuating said devices, a shoe supporting jack comprising means for clamping a shoe in position on the jack, said jack being movable about a pivotal axis transverse and substantially parallel to the shoe bottom to transfer the point of operation along the shoe, mechanism mounted in the jack for unclamping the shoe comprising a rotatable shaft parallel to said pivotal axis, a pulley on the shaft, a cord passing over the pulley, a pattern cam shaft, means for driving said cam shafts in timed relation to each other, and connections from the pattern cam shaft for exerting a pull on the cord to rotate the pulley.

40. A machine for use in the manufacture of shoes having, in combination, means for performing an operation progressively along the bottom margin of a shoe, an operating cam shaft and connections for actuating said devices, a shoe supporting jack movable about a pivotal axis transverse and substantially parallel to the shoe bottom to transfer the point of operation along the shoe, mechanism acting automatically when thrown into operation to clamp a shoe placed on the jack, mechanism mounted in the jack for resetting the clamping mechanism comprising a rotatable shaft parallel to said pivotal axis, a pulley on the shaft, a cord passing over the pulley, a pattern cam shaft, means for driving said cam shafts in timed relation to each other, and connections from the pattern cam shaft for exerting a pull on the cord to rotate the pulley.

41. A machine for use in the manufacture of shoes having, in combination, means for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, shoe supporting means mounted in the frame for rocking movement about an axis extending close to the shoe bottom lengthwise of the shoe, mechanism mounted in the jack frame to shift the position of the shoe supporting means transversely with relation to said lengthwise axis comprising a rotatable shaft parallel to said pivotal axis, a pulley on the shaft, a cord passing over the pulley, a pattern cam shaft, means for driving said cam shafts in timed relation to each other, and connections from the pattern cam shaft for exerting a pull on the cord to rotate the pulley.

42. A machine for use in the manufacture of shoes having, in combination, means for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, shoe supporting means mounted in the frame for rocking movement about an axis extending close to the shoe bottom lengthwise of the shoe, means for clamping a shoe on said supporting means, mechanism mounted in the jack frame acting during the operation on the shoe to shift the position of the shoe supporting means transversely with relation to said lengthwise axis and at the conclusion of the operation to unclamp the shoe comprising a rotatable shaft parallel to said pivotal axis, a pattern cam shaft, means for driving said cam shafts in timed relation to each other, and connections from the pattern cam shaft for rotating said rotatable shaft.

43. A machine for use in the manufacture of shoes having, in combination, means for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, shoe supporting means mounted in the frame for rocking movement about an axis extending close to the shoe bottom lengthwise of the shoe, mechanism acting automatically when thrown into operation to clamp a shoe on said supporting means, mechanism mounted in the jack frame acting during the operation on the shoe to shift the position of the shoe supporting means transversely with relation to said lengthwise axis and at the conclusion of the operation to reset the clamping mechanism comprising a rotatable shaft parallel to said pivotal axis, a pattern cam shaft, means for driving said cam shafts in timed relation to each other, and connections from the pattern cam shaft for rotating said rotatable shaft.

44. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a base pivoted to swing about an axis parallel to the pivotal axis of the jack frame, an arm mounted on the base to move therewith during the swinging movements of the base and a jack frame supporting link pivotally connected at one end to the arm and at the other end to the jack frame to swing about axes parallel to the pivotal axis of the base, and shoe supporting means mounted in the jack frame, means for clamping a shoe on said supporting means, mechanism for unclamping the shoe comprising a rotatable shaft mounted in the jack frame, a pulley on the shaft, pulleys mounted concentrically with the pivotal axis of the jack frame and with the pivotal connection of the supporting link with the arm, a cord passing over the pulleys, a pattern cam shaft, means for driving said cam shafts in timed relation to each other, and connections from the pattern cam shaft for exerting a pull on the cord.

45. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a base pivoted to swing about an axis parallel to the pivotal axis of the jack frame, an arm mounted on the base to move therewith during the swinging movements of the base and a jack frame supporting link pivotally connected at one end to the arm and at the other end to the jack frame to swing about axes parallel to the pivotal axis of the base, shoe supporting means mounted in the jack frame, mechanism acting automatically when thrown into operation to clamp a shoe placed on said supporting means, mechanism mounted in the jack frame for resetting the clamping mechanism comprising a rotatable shaft mounted in the jack frame, a pulley on the shaft, pulleys mounted concentrically with the pivotal axis of the jack frame and with the pivotal connection of the supporting link with the arm, a cord passing over the pulleys, a pattern cam shaft, means for driving said cam shafts in timed relation to each other, and connections from the pattern cam shaft for exerting a pull on the cord.

46. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a base pivoted to swing about an axis parallel to the pivotal axis of the jack frame, an arm mounted on the base to move therewith during the swinging movements of the base, and a jack frame supporting link pivotally connected at one end to the arm and at the other end to the jack frame to swing about axes parallel to the pivotal axis of the base, shoe supporting means mounted in the jack frame for rocking movement about an axis extending close to the shoe bottom lengthwise of the shoe, mechanism mounted in the jack frame to shift the position of the shoe supporting means transversely with relation to said lengthwise axis comprising a rotatable shaft mounted in the jack frame, a pulley on the shaft, pulleys mounted concentrically with the pivotal axis of the jack frame and with the pivotal connection of the supporting link with the arm, a cord passing over the pulleys, a pattern cam shaft, means for driving said cam shafts in timed relation to each other, and connections from the pattern cam shaft for exerting a pull on the cord.

47. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a base pivoted to swing about an axis parallel to the pivotal axis of the jack frame, an arm mounted on the base to move therewith during the swinging movements of the base, and a jack frame supporting link pivotally connected at one end to the arm and at the other end to the jack frame to swing about axes parallel to the pivotal axis of the base, shoe supporting means mounted in the jack frame, means for clamping a shoe on said supporting means, mechanism for unclamping the shoe comprising a rotatable shaft mounted in the jack frame, a pulley on the shaft, pulleys mounted concentrically with the pivotal axis of the jack frame and with the pivotal connection of the supporting link with the arm, a cord passing over the pulleys, a guiding pulley on the base and a guide outside of the base arranged to lead the cord substantially along the pivotal axis of the base, a pattern cam shaft, means for driving said cam shafts in timed relation to each other, and connections from the pattern cam shaft for exerting a pull on the cord.

48. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a base pivoted to swing about an axis parallel to the pivotal axis of the jack frame, an arm mounted on the base to move therewith during the swinging movements of the base, and a jack frame supporting link pivotally connected at one end to the arm and at the other end to the jack frame to swing about axes parallel to the pivotal axis of the base, shoe supporting means mounted in the jack frame, mechanism acting automatically when thrown into operation to clamp a shoe placed on said supporting means, mechanism mounted in the jack frame for resetting the clamping mechanism comprising a rotatable shaft mounted in the jack frame, a pulley on the shaft, pulleys mounted concentrically with the pivotal axis of the jack frame and with the pivotal connection of the supporting link with the arm, a cord passing over the pulleys, a guiding pulley on the base, and a guide outside of the base arranged to lead the cord substantially along the pivotal axis of the base, a pattern cam shaft, means for driving said cam shafts in timed relation to each other, and connections from the pattern cam shaft for exerting a pull on the cord.

49. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a base pivoted to swing about an axis parallel to the pivotal axis of the jack frame, an arm mounted on the base to move therewith during the swinging movements of the base, and a jack frame supporting link pivotally connected at one end to the arm and at the other end to the jack frame to swing about axes parallel to the pivotal axis of the base, shoe supporting means mounted in the jack frame for rocking movement about an axis extending close to the shoe bottom lengthwise of the shoe, mechanism mounted in the jack frame to shift the position of the shoe supporting means transversely with relation to said lengthwise axis comprising a rotatable shaft mounted in the jack frame, a pulley on the shaft, pulleys mounted concentrically with the pivotal axis of the jack frame and with the pivotal connection of the supporting link with the arm, a cord passing over the pulleys, a guiding pulley on the base, and a guide outside of the base arranged to lead the cord substantially along the pivoted axis of the base, a pattern cam shaft, means for driving said cam shafts in timed relation to each other, and connections from the pattern cam shaft for exerting a pull on the cord.

50. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a base pivoted to swing about an axis parallel to the pivotal axis of the jack frame, an arm mounted on the base to move therewith during the swinging movements of the base, and a jack frame supporting link pivotally connected at one end to the arm and at the other end to the jack frame to swing about axes parallel to the pivotal axis of the base.

51. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a base pivoted to swing about an axis parallel to the pivotal axis of the jack frame, an arm mounted on the base to move therewith during the swinging movements of the base and connected therewith so as to be capable of a swinging movement about an axis parallel to the shoe bottom at right angles to pivotal axis of the base, and a jack frame supporting link pivotally connected at one end to the arm and at the other end to the jack frame to swing about axes parallel to the pivotal axis of the base.

52. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a member pivoted to swing about an axis parallel to the pivotal axis of the jack frame, a jack frame supporting link pivotally connected at one end to said member and at the other end to the jack frame to swing about axes parallel to the pivotal axis of said member, and means for exerting an upward pressure on the jack to force the shoe towards the operating devices comprising a cord, a guide on the member over which the cord passes, a lever pivoted on the member to which the cord is secured, connections from the lever to the jack frame, and means for exerting a pull on the cord.

53. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a member pivoted to swing about an axis parallel to the pivotal axis of the jack frame, a jack frame supporting link pivotally connected at one end to said member and at the other end to the jack frame to swing about axes parallel to the pivotal axis of said member, and means for exerting an upward pressure on the jack to force the shoe towards the operating devices comprising a cord, a guide on the member over which the cord passes, connections from one end of the cord to the jack frame, and means connected to the other end of the cord for exerting a pull on the cord.

54. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a member pivoted to swing about an axis parallel to the pivotal axis of the jack frame, a jack frame supporting link pivotally connected at one end to said member and at the other end to the jack frame to swing about axes parallel to the pivotal axis of said member, and means for exerting an upward pressure on the jack to force the shoe towards the operating devices comprising a cord, guides on said member over which the cord passes, one of said guides being arranged to lead the cord to the member at substantially the pivotal axis of the member, connections between one end of the cord and the jack frame to which connections the cord is led by another of said guides, and means connected to the other end of the cord for exerting a pull on the cord.

55. A machine for use in the manufacture of shoes having, in combination, devices for performing an operation progressively along the bottom margin of a shoe, an operating cam shaft and connections for actuating said devices, a shoe supporting jack frame movable about a pivotal axis transverse and substantially parallel to the shoe bottom to transfer the point of operation along the shoe, and a supporting structure for the jack frame comprising a member pivoted to swing about an axis parallel to the pivotal axis of the jack frame, a jack frame supporting link pivotally connected at one end to said member and at the other end to the jack frame to swing about axes parallel to the pivotal axis of said member, and means for exerting an upward pressure on the jack to force the shoe towards the operating devices comprising a cord, guides on said member over which the cord passes, a guide outside of said member arranged to lead the cord to one of the guides on said member substantially along the pivotal axis of said member, connections between one end of the cord and the jack frame to which connections the cord is led by another of the guides on said member, and means connected to the other end of the cord for exerting a pull on the cord.

56. A machine for use in the manufacture of shoes having, in combination, devices for performing an operation progressively along the bottom margin of a shoe, an operating cam shaft and connections for actuating said devices, a shoe supporting jack, a pattern cam and connections for moving the jack to transfer the point of operation of said devices along the shoe, said connections comprising a constant throw cam actuated lever, a motion transmitting link through which the motion of the cam actuated lever is transmitted to the jack, a support to which one end of the link is pivoted, said support being adjustably mounted on the lever to vary the distance of the pivot of the link from the pivot of the lever, a locking rod connected to the support and passing through the pivotal axis of the lever, and means for locking the rod against movement with relation to the lever.

57. A machine for use in the manufacture of shoes having, in combination, devices for performing an operation progressively along the bottom margin of a shoe, an operating cam shaft and connections for actuating said devices, a shoe supporting jack, a pattern cam and connections for moving the jack to transfer the point of operation of said devices along the shoe, said connections comprising a constant throw cam actuated lever, a motion transmitting link through which the motion of the cam actuated lever is transmitted to the jack, and a support to which one end of the link is pivoted adjustably mounted on the lever to vary the distance of the pivot of the link from the pivot of the lever.

58. A machine for use in the manufacture of shoes having, in combination, devices for performing an operation progressively along the bottom margin of a shoe, an operating cam shaft and connections for actuating said devices, a shoe supporting jack, a pattern cam and connections for moving the jack to transfer the point of operation of said devices along the shoe, said connections comprising a constant throw cam actuated lever, a motion transmitting link through which the motion of the cam actuated lever is transmitted to the jack, a support to which one end of the link is pivoted, said support being adjustably mounted on the lever to vary the distance of the pivot of the link from the pivot of the lever, a locking rod connected to the support and passing through the pivotal axis of the lever, a locking plunger mounted in axial alignment with the pivot of the lever, and means for actuating the plunger to lock the rod against movement with relation to the lever.

59. A machine for use in the manufacture of shoes having, in combination, devices for performing an operation progressively along the bottom margin of a shoe, an operating cam shaft and connections for actuating said devices, a shoe supporting jack, a pattern cam and connections for moving the jack to transfer the point of operation of said devices along the shoe, said connections having provision for adjustment to vary the extent of the movements imparted to the jack, devices for locking said connections in adjusted position, a pattern cam shaft, means for driving said cam shafts in timed relation to each other, and means including a cam rotating with the pattern cam shaft acting at the completion of the operation on the shoe to actuate said locking devices to release said connections.

60. A machine for use in the manufacture of shoes having, in combination, devices for performing an operation progressively along the bottom margin of a shoe, an operating cam shaft and connections for actuating said devices, a shoe supporting jack, pattern cams and connections for controlling the relative positions of said devices and jack during the operation on the shoe, and for performing certain additional operations after the operation on the shoe by said devices has been completed, a driving clutch, mechanism driven by the clutch for rotating the operating cam shaft and the pattern cams, and mechanism driven by the clutch in timed relation with the operating cam shaft and pattern cams for opening the clutch.

61. A lasting machine having, in combination, lasting devices including an upper tensioning gripper, cyclically operating mechanism for imparting to the gripper updraw movements away from the sole of a shoe presented to said devices, and return movements towards the sole to last progressively the shoe upper as the point of operation is transferred along the shoe, a guide engaging the gripper on the side remote from the center line of the sole, and means for yieldingly forcing the gripper in a direction transverse to the center line of the sole substantially at right angles to the updraw and return movements against said guide.

62. A lasting machine having, in combination, lasting devices including an upper tensioning gripper, cyclically operating mechanism for imparting to the gripper updraw movements away from the sole of a shoe presented to said devices, and return movements towards the sole to last progressively the shoe upper as the point of operation is transferred along the shoe, means for supporting the gripper permitting a movement transverse to the center line of the sole substantially at right angles to the updraw and return movements, an adjustable guide engaging the gripper to limit said transverse movement, and means for yieldingly forcing the gripper against said guide.

63. A lasting machine having, in combination, lasting devices including an upper tensioning gripper, means for imparting to the gripper updraw movements away from the sole of a shoe presented to said devices, and return movements towards the sole, a wiper engaging the upper between the gripper and the sole and acting to force the upper inwardly over the sole, and means acting independently of the upper to impart simultaneously an inward movement to the gripper.

64. A lasting machine having, in combination, lasting devices including an upper tensioning gripper, means for imparting to the gripper updraw movements away from the sole of a shoe presented to said devices, and return movements towards the sole, a wiper engaging the upper between the gripper and the sole and acting to force the upper inwardly over the sole, a wiper carrier, and means actuated by the wiper carrier for imparting simultaneously an inward movement to the gripper.

65. A lasting machine having, in combination, lasting devices including an upper tensioning gripper, means for imparting to the gripper updraw movements away from the sole of a shoe presented to said devices, and return movements towards the sole, a wiper engaging the upper between the gripper and the sole and acting to force the upper inwardly over the sole, a wiper carrier, and a cam plate on the wiper carrier arranged to engage the gripper and impart a simultaneous inward movement to the gripper.

ROBERT H. LAWSON.